(12) United States Patent
Sammeta et al.

(10) Patent No.: US 9,369,187 B1
(45) Date of Patent: Jun. 14, 2016

(54) ANTENNA SWITCHING IN AN ANTENNA SYSTEM

(71) Applicant: AMAZON TECHNOLOGIES, INC., Seattle, WA (US)

(72) Inventors: Rohit Sammeta, Mountain View, CA (US); Peruvemba Ranganathan Sai Ananthanarayanan, Sunnyvale, CA (US); Adrian Napoles, Cupertino, CA (US); Anuj Dron, San Jose, CA (US); Mercyma Deeba Balachandran, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/692,686

(22) Filed: Apr. 21, 2015

(51) Int. Cl.
   *H04B 15/00* (2006.01)
   *H04B 7/04* (2006.01)
(52) U.S. Cl.
   CPC ............. *H04B 7/0404* (2013.01); *H04B 15/00* (2013.01)

(58) Field of Classification Search
   CPC .............. H04B 3/32; H04B 3/23; H04B 3/54; H04L 25/03343; H04L 25/497; H04L 25/03057; H04L 25/4902; H04L 1/0009; H04L 1/0041; H04L 25/49
   USPC .......................... 375/285, 259, 316, 295, 219
   See application file for complete search history.

(56) References Cited

U.S. PATENT DOCUMENTS

| | | | |
|---|---|---|---|
| 2011/0237207 A1* | 9/2011 | Bauder | H01Q 1/521 455/78 |
| 2012/0013519 A1* | 1/2012 | Hakansson | H01Q 1/243 343/835 |
| 2013/0315116 A1* | 11/2013 | Chen | H04B 1/44 370/297 |

* cited by examiner

*Primary Examiner* — Zewdu Kassa
(74) *Attorney, Agent, or Firm* — Lowenstein Sandler LLP

(57) ABSTRACT

Technologies described herein are directed to switching between antennas in response to a change in an isolation value identified using a neutralization line. A device may include a first set of antennas including a first antenna, a second antenna, a neutralization line coupled between the first antenna and the second antenna, and a controller. The controller is coupled to the neutralization line. The controller determines a first isolation value between the first antenna and the second antenna using the neutralization line, determines a change in isolation value between the first antenna and the second antenna to a second isolation value, determines that the second isolation value exceeds a threshold, and switches from using the first set of antennas to using a second set of antennas.

20 Claims, 17 Drawing Sheets

US 9,369,187 B1

ANTENNA SWITCHING IN AN ANTENNA SYSTEM

BACKGROUND

A large and growing population of users is enjoying entertainment through the consumption of digital media items, such as music, movies, images, electronic books, and so on. The users can use a variety of electronic devices to consume such media items. The electronic devices (e.g., user devices) can be electronic book readers, cellular telephones, personal digital assistants (PDAs), portable media players, tablet computers, netbooks, laptops, and so forth. The user devices can wirelessly communicate with a communications network to consume the digital media items. To wirelessly communicate with other devices, these electronic devices can include multiple antennas configured to communicate on one or more types of communication networks, such as a communications network using the Bluetooth® technology, the Zigbee® technology, the Wi-Fi® technology, or a cellular communications network.

When antennas of a device may come into close proximity with other objects, the other objects may interfere with signals being sent and/or received at the device (e.g., signal interference and signal distortion). For example, when an antenna comes into close proximity of a human body or a metal object, signal interference and signal distortion can occur because energy that is intended to be transmitted (e.g., radiated away) to another device may be absorbed or scattered by the human body or the metal object. Similarly, energy that that may be intended to be received by an antenna of a receiving device may be absorbed or scattered (e.g., captured) by the human body or the metal object. Signal interference or signal distortion can reduce an antenna efficiency and performance of antennas to transmit or receive data.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
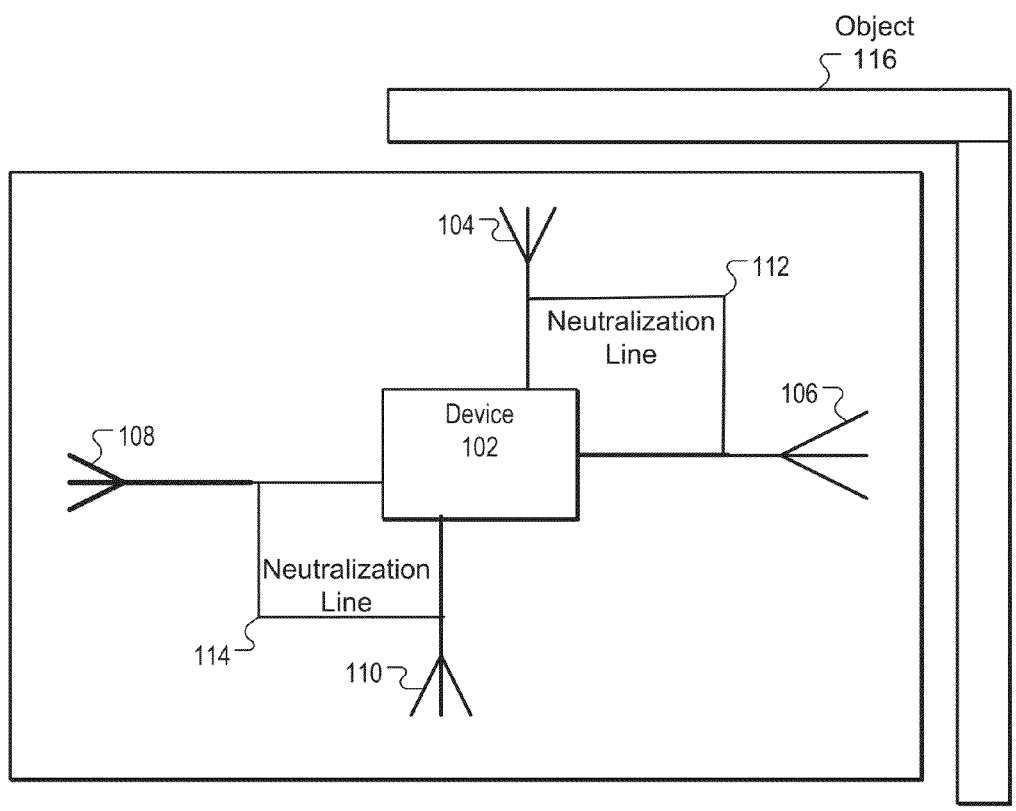
FIG. 1A illustrates a device switching between a first set of antennas and a second set of antennas according to one embodiment.

Many electronic devices may have multiple antennas configured to transmit and/or receive signals at different frequencies or for different types of communications networks. For example, an electronic device can have a personal area network (PAN) antenna configured to receive signals based on an Institute of Electrical and Electronics Engineers (IEEE) 802.15.4 standard, released by the ZigBee® Alliance and commonly referred to as ZigBee® wireless technology and a wireless local area network (WLAN) antenna configured to receive signals based on an IEEE 802.11 standard, released by the Wi-Fi® alliance and commonly referred to as the Wi-Fi® wireless technology. Examples of such user devices can include electronic book readers, portable digital assistants, mobile phones, laptop computers, portable media players, tablet computers, cameras, video cameras, netbooks, notebooks, desktop computers, gaming consoles, DVD players, media centers, smart speaker device, voice-controlled devices, set-top boxes, and so forth.

When antennas of a device may be in close proximity to an interfering object, the interfering object may distort a signal transmitted or received by an antenna. For example, a signal transmitted by the antenna can be partially absorbed by the interfering object, causing distortion or weakening of the signal. In another example, a signal intended to be received by the antenna can instead be at least partially absorbed by the interfering object, causing distortion or weakening of the signal.

Interfering objects can impact reception of a signal by antennas of an electronic device. For example, a human body is primarily water. When water is located between a transmitting antenna and a receiving antenna, the water can interfere with the receiving antenna receiving a signal from the transmitting antenna. In another example, a variety of household appliances (such as cordless phones, baby monitors, and microwave ovens) can cause signal interference by using a frequency to communicate data that may be the same or similar to the transmitting antenna, such as a cordless phone using a 2.4 gigahertz (GHz) frequency may interfere the device communicating using a wireless local area network (WLAN). Depending on the orientation and/or proximity of the household appliances to an antenna of the electronic device, the household appliances may interfere with the signal between the transmitting antenna and the receiving antenna. Interfering objects can reduce an antenna efficiency and performance of an antenna when transmitting and/or receiving signals.

Traditionally, to reduce signal distortion and signal interference, the antennas of the electronic device can be located a threshold distance from the interfering object. However, for electronic devices, such as portable devices, which may be communicating in a variety of environments and conditions, separating the antennas from interfering objects can be difficult.

The embodiments described herein may address the above noted deficiency by an electronic device using neutralization lines between a first set of antennas to detect an interfering object and switch to a second set of antennas to reduce or eliminate the interference caused by the interfering object. In environments and conditions where antennas may be close to interfering objects (such as human bodies or metal), the neutralization line can detect the interference from the interfering object and trigger a switching event. During at the switching event, the electronic device may switch to another set of antennas. The other set of antennas may not be affected by the interfering object.

FIG. 1A illustrates a device 102 switching between a first set of antennas and a second set of antennas according to one embodiment. The first set of antennas can include antenna 104 and antenna 106 connected by neutralization line 112. The second set of antennas can include antenna 108 and antenna 110 connected by neutralization line 114. The device 102 can use the neutralization line 112 to determine when an object 116 may be adjacent the first set of antennas. In one example, the object 116 can be material that interferes with a signal communicated between the device 102 and another device, such as metal material, wood material, or glass material. In response to the device 102 determining that the object 116 may be adjacent to the first set of antennas, the device can switch to using the second set of antennas.

In one example, the device 102 can dynamically switch between the first set of antennas and the second set of antennas. For dynamic switching, the device 102 can monitor isolation values for the first antenna set and the second antenna set. The device 102 can select the antenna set with a lowest isolation value (e.g., a highest isolation level). For example, the first set of antennas 104 and 106 can have a lower isolation value than the second set of antennas 108 and 110 because of the proximity of object 116 relative to the first antenna set. In this example, a higher isolation value can indicate that the object 116 may be a greater distance from the second antenna set than from the first antenna set. In another example, the device 102 includes a third set of antennas. In this example, the device 102 can select the first set of antennas, second set of antennas, or third set of antennas with the highest isolation value. An advantage of the device 102 using the second antenna set with the highest isolation value can be to use antennas without a deteriorated performance because of the proximity of the object 116. In one example, the device 102 can check the isolation values of the first and second antenna sets on a continuous or semi-continuous basis. In another example, the device 102 can check the isolation values of the first and second antenna sets on a periodic basis. In another example, the device 102 can determine when to switch between the first and second antenna sets to reduce or avoid a loss of signal or data. For example, a loss of signal caused by an interfering object can be avoided by maintaining an isolation value above a threshold amount. The device 102 can monitor and switch between the first and second antenna sets using firmware and/or software.

In another example, the device 102 can statically switch between the first antenna set and the second antenna set. For static switching, when the device 102 determines that the object 116 may be adjacent the first antenna set, the device 102 can randomly select another antenna set to communicate data (e.g., a primary radiator). In this example, the device 102 can periodically check the isolation of the primary radiator and can switch to a second antenna set when an isolation value between the antennas 104 and 106 of the first antenna set decreases below a threshold value. The device can use the second antenna set as a new primary radiator and continue to use the second antenna set until the isolation value of the second antenna set decreases below the threshold value or exceeds the threshold range.

In one example, a user can place the device 102 on the object 116, such as a table. When the device 102 may be placed on the table, a performance of a current antenna set that the device 102 uses to communicate data may be compromised or reduced due to signal interference by the object 116. When device 102 uses the neutralization line to detect a proximity of the table to the current antenna set, the device 102 can switch to another antenna set in the device that may be farther away from the table.

In another example, the device 102 can use neutralization line 112 to determine when a human body or a metal object may be closer to antenna 104 and/or antenna 106 relative to antenna 108 and/or antenna 110. In response to the human body or the metal object being closer to antenna 104 and/or antenna 106, the device 102 can switch to using antennas 108 and/or 110 to communicate data. In another example, the device 102 can use the neutralization line 112 to determine when the human body or the metal object may be closer to antenna 108 and/or antenna 110 relative to antenna 104 and/or antenna 106. The device 102 can switch to using antennas 104 and/or 106 to communicate data. An advantage of switching to an antenna set that may be farther from object 116 can be to maintain a threshold level of antenna performance and reduce an environmental impact on antenna performance.

Figure 1B:
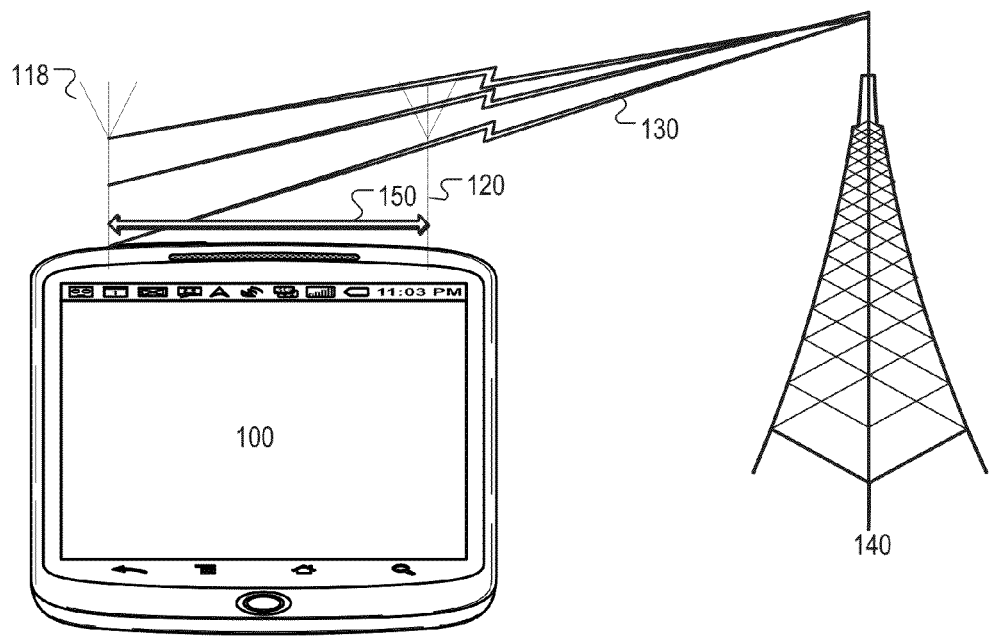
FIG. 1B illustrates a user device with a first antenna communicating a signal with a transceiver antenna according to one embodiment.

FIG. 1B illustrates a user device 100 with a first antenna 118 communicating a signal 130 with a transceiver antenna 140 according to one embodiment. A second antenna 120 can absorb at least a portion of the signal 130 communicated between the first antenna 118 and the transceiver antenna 140.

The first and second antennas 118 and 120 can be separated by a distance 150 to reduce mutual coupling and interference between the first and second antennas 118 and 120. However, the second antenna 120 may still interfere with at least a portion of the signal 130 communicated between the transceiver antenna 140 and the first antenna 118 by absorbing the signal 130.

Figure 1C:
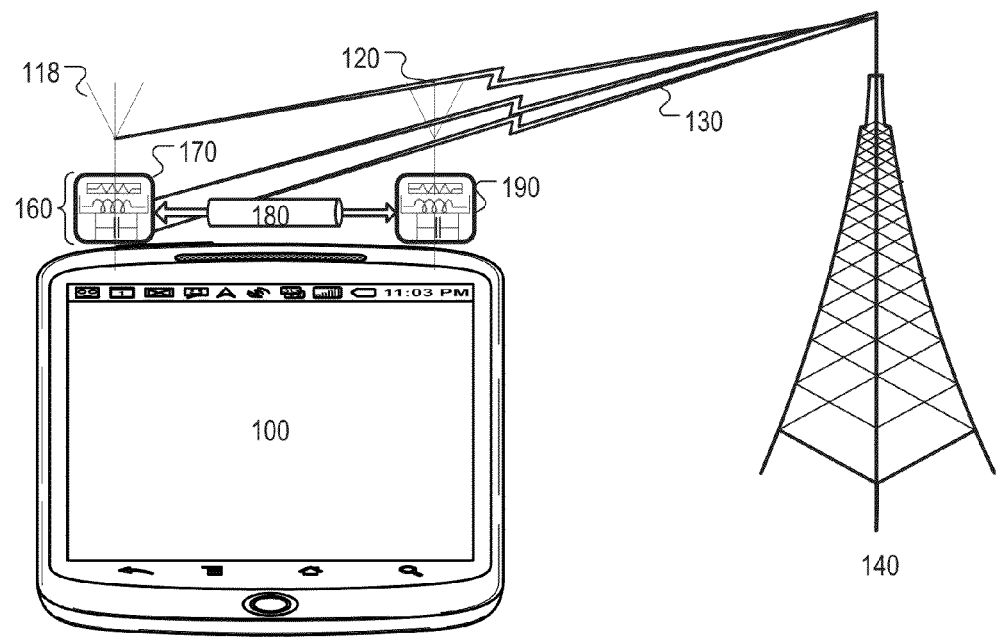
FIG. 1C illustrates a user device with an adaptive neutralization line between a first antenna and a second antenna according to one embodiment.

FIG. 1C illustrates the user device 100 with an adaptive neutralization line 160 between the first antenna 118 and the second antenna 120 according to one embodiment. The adaptive neutralization line 160 can be an auxiliary connection between the first and second antennas 118 and 120 to cancel out or filter the mutual coupling and interference between the first and second antennas 118 and 120 to produce ultra-high levels of isolation. The adaptive neutralization line 160 can include a transmission line 180, a first RLC component 170, and a second RLC component 190. The transmission line 180 can connect the first RLC component 170 and the second RLC component 190 to conduct resonant currents between the first RLC component 170 and the second RLC component 190 to at least partially cancel mutual coupling and interference between the first antenna 118 and the second antenna 120. The transmission line 180 can be configured to phase shift the conducted resonant currents to cause at least partial cancellation of the signal 130 received by the first antenna 118 and the second antenna 120.

In one example, a controller can vary a resistance and reactance of the transmission line 180 and adjust the RLC components 170 and 190 to control the null of the adaptive neutralization line 160, in view of the effects of the environment, to maintain a threshold isolation value between the first and second antennas 118 and 120. An advantage of varying the resistance and reactance of transmission line 180 and the RLC components 170 and 190 can be to maintain a threshold isolation value (e.g., a threshold decoupling or de-correlation level) between the first and second antennas 118 and 120 as an environment that the user device 100 may be used in varies.

Figure 1D:
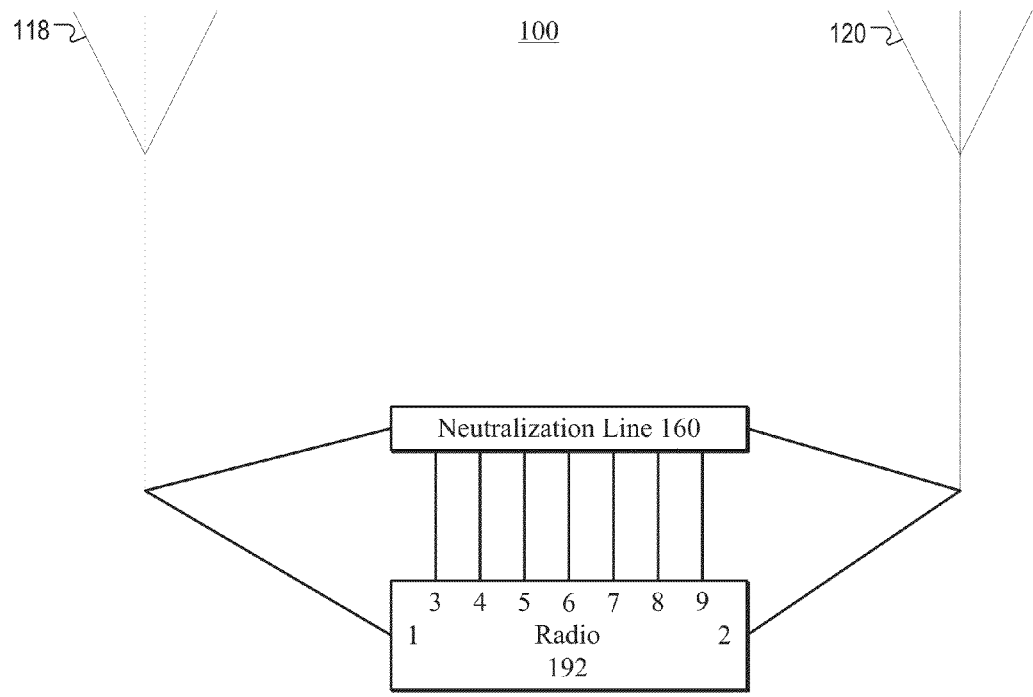
FIG. 1D illustrates a user device configured to determine an isolation value between a first antenna and a second antenna according to one embodiment.

FIG. 1D illustrates a user device 100 configured to determine an isolation value between the first antenna 118 and the second antenna 120 according to one embodiment. The user device 100 can include a radio 192 (such as a transceiver), the first and second antennas 118 and 120, and an adaptive neutralization line 160. The radio 192 can be coupled to the first and second antennas 118 and 120 to communicate information with another device. The adaptive neutralization line 160 can be coupled to the radio 192 and can connect the first and second antennas 118 and 120. The radio 192 can include a controller to direct signals to the antennas 118 and 120 via interfaces (pins or ports 1 and 2) of the radio 192. For example, interfaces 1 and 2 can receive and transmit signals via the first and second antennas 118 and 120. The controller can also control variable components of the adaptive neutralization line 160 via interfaces 3-9. In one example the interfaces 1-9 can be pin-outs of the radio 192. In another example, the interfaces 1-9 can be control lines of the radio 192. In another example, the adaptive neutralization line 160 includes a variable transmission line and one or more variable components that are controllable by the controller to reduce mutual coupling and increase isolation between the first antenna and the second antenna. In one example, the variable transmission line and the variable component are set according to a first set of variable settings in a first state (e.g., a previous state than the current state when the current state is determined to be different). The variable settings may be different lengths of the variable transmission line, values for variable components, or both, which are used to set the particular length and particular values of the variable components to achieve the desired isolation between the antennas.

The controller can determine a current state of the electronic device using various inputs, such as a measurement from a sensor, as described herein. The controller determines that the current state is different than the previous state, i.e., the current state is different than the first state. The controller can identify, in a look-up table stored in a memory device coupled to the controller, a second set of variable settings to reconfigure the adaptive neutralization line for the current state. The controller changes the first set of variable settings to the second set of variable settings to reconfigure the adaptive neutralization line for the current state.

The controller can measure an isolation value between the first and second antennas 118 and 120 by transmitting a signal using the first antenna 118 and monitoring the second antenna 120 to determine when the second antenna 120 receives the signal and the signal strength of the received signal. The controller can use the signal strength to determine an isolation value between the first and second antennas 118 and 120.

Figure 1E:
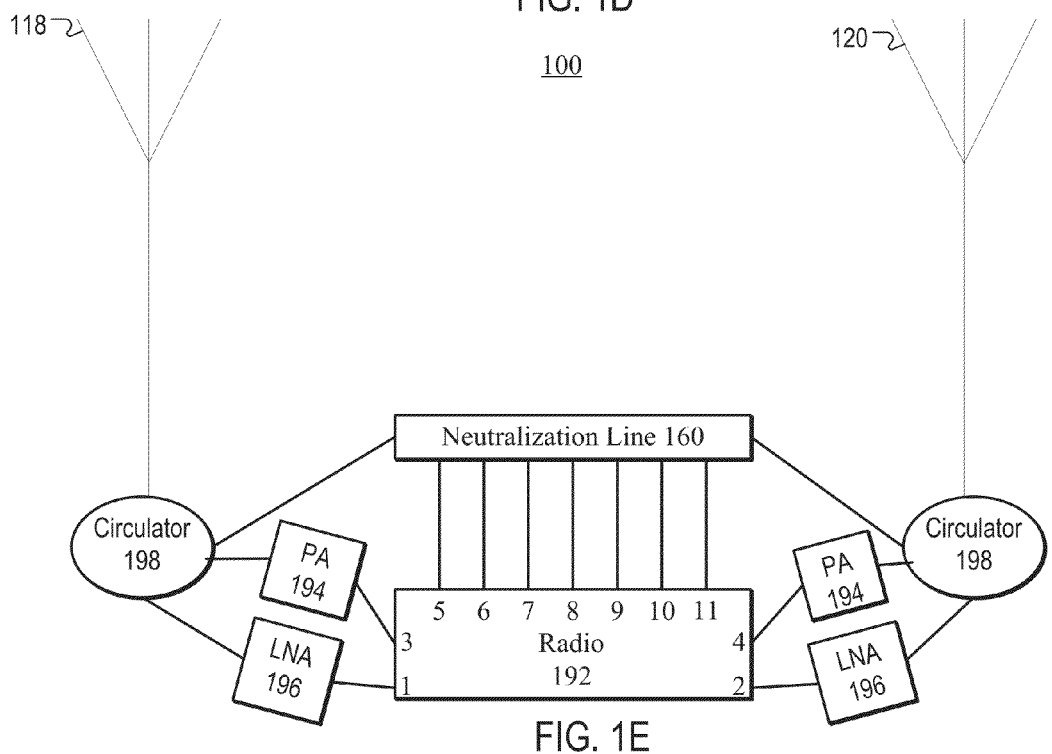
FIG. 1E illustrates a user device configured to determine an isolation value between a first antenna and a second antenna according to one embodiment.

FIG. 1E illustrates a user device 100 configured to determine an isolation value between the first and second antennas 118 and 120 according to one embodiment. The user device 100 can include a radio 192, the antennas 118 and 120, and an adaptive neutralization line 160. The radio 192 can be coupled to the antennas 118 and 120 via a power amplifier (PA) 194 or a low noise amplifier (LNA) 196 coupled to a circulator 198. In one example, the radio 192 can transmit signals to another device by sending a signal from an interface 3 or 4 to the PA 194 coupled to the circulator 198. In this example, the circulator 198 can direct the signal to the first antenna 118 or the second antenna 120, respectively. In another example, the radio 192 can receive signals from another device by receiving the signal at an interface 1 or 2 from the LNA 196 coupled to the circulator 198. In this example, the circulator 198 can relay the signal from the first antenna 118 or the second antenna 120, respectively, via the LNA 196 to the interface 1 or 2. The radio 192 can include a controller to control variable components of the adaptive neutralization line 160 via interfaces 5-11. For example, the variable components can be variable resistors, capacitors, and/or inductors and the controller can vary the variable components. In another example, the interfaces 1-11 can be pin-outs of the radio 192. In another example, the interfaces 1-11 can be control lines of the radio 192.

In one example, the controller can passively measure the isolation value between the first antenna 118 and the second antenna 120 by transmitting a signal from the first antenna 118 and monitoring the second antenna 120, as discussed above. In another example, the controller can measure the isolation value between the first and second antennas 118 and 120 when the first and second antennas 118 and 120 may both be transmitting. In this example, the controller can monitor interface 1 to determine an actual return loss of the first antenna 118 and can monitor interface 2 to determine an actual return loss of the second antenna 120. The controller can compare the actual return losses of the first and second antennas 118 and 120 to a predetermined return loss value for the first and second antennas 118 and 120 to determine an isolation value between the first and second antennas 118 and 120. An advantage of determining the isolation value of the first and second antennas 118 and 120 by comparing the return loss values can be to determine an isolation value between the first and second antennas 118 and 120 as the radio 192 may be transmitting signals using the first and second antennas 118 and 120.

Figure 2A:
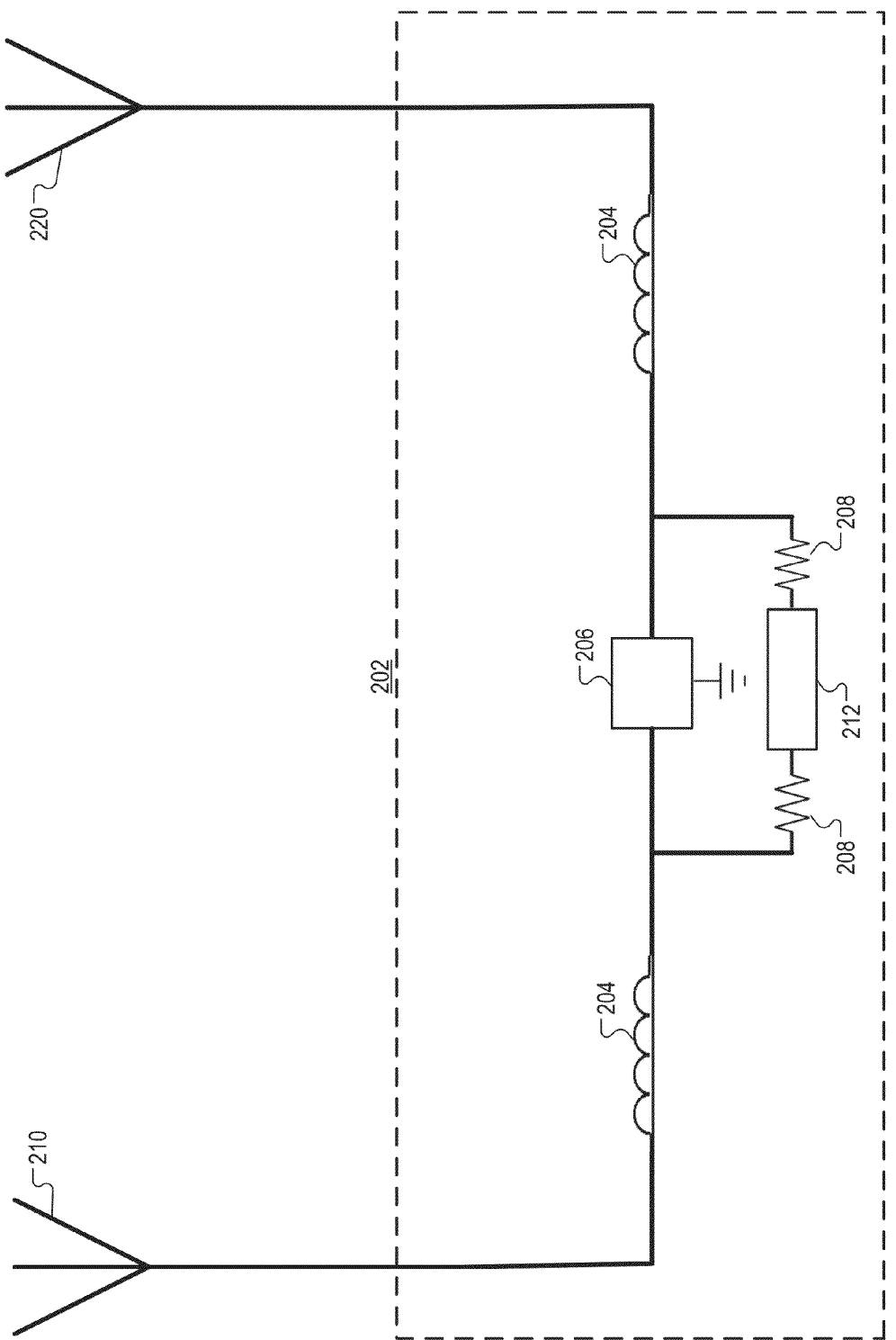
FIG. 2A illustrates a neutralization line between a first antenna and a second antenna according to one embodiment.

FIG. 2A illustrates a neutralization line 202 between a first antenna 210 and a second antenna 220 according to one embodiment. The neutralization line 202 can be a stripline circuit that may connect the first antenna 210 and the second antenna 220 to isolate the first antenna 210 from interfering with the second antenna 220. The stripline circuit can include a strip of metal (e.g., a transmission line) that can be located between two parallel ground planes. A width and a thickness of the strip of metal can control impedance characteristics of the stripline circuit. The neutralization line 202 can include various components such as inductors 204, a stripline 206, resistors 208, and a capacitor 212 to control impedance characteristics of the neutralization line 202. The neutralization line 202 can be an auxiliary connection between the first and second antennas 210 and 220 to cancel out or filter mutual coupling and interference between the first and second antennas 210 and 220 (e.g., isolate the first and second antennas 210 and 220). The inductors 204, the stripline 206, the resistors 208, and the capacitor 212 can have fixed values to produce a fixed impedance value for the neutralization line 202. The list of components is not an exhaustive list, but rather an exemplary list of components that the neutralization line 202 may include.

Figure 2B:
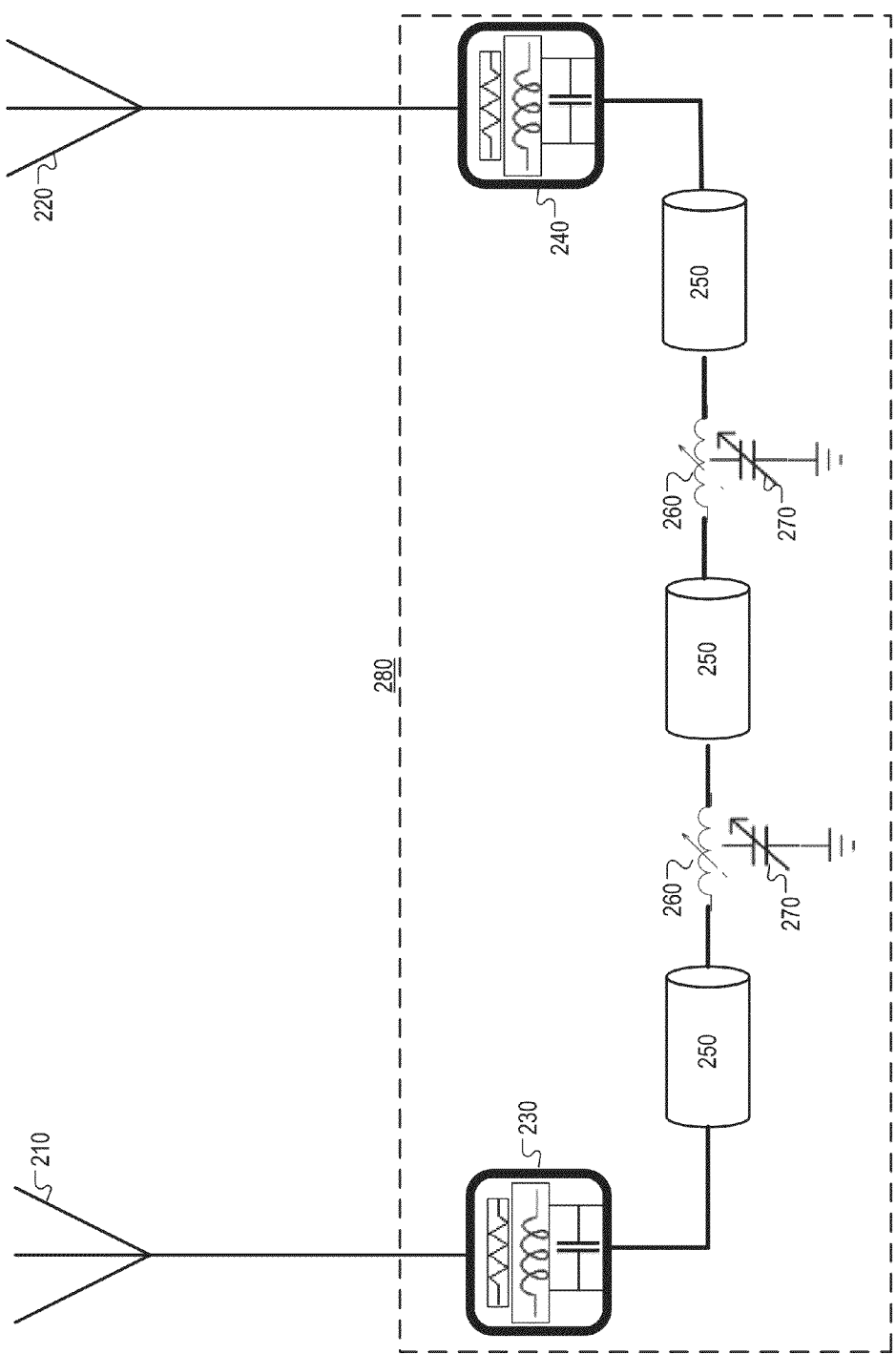
FIG. 2B illustrates a first antenna and a second antenna connected by an adaptive neutralization line with a controller according to one embodiment.

FIG. 2B illustrates a first antenna 210 and a second antenna 220 connected by an adaptive neutralization line with a controller 280 according to one embodiment. The controller 280 can adjust variable components of the first and second antennas 210 and 220. The variable components can include: RLC components 230 and 240, transmission lines 250, variable inductors 260, and/or variable capacitors 270 of the adaptive neutralization line. The variable components of the adaptive neutralization line may include other variable components, such as an adjustable resistor. The list of variable components is not an exhaustive list, but rather an exemplary list of components that may be adjusted by the controller 280.

The controller 280 can monitor an isolation value between the first antenna 210 and the second antenna 220 and adjust the variable components to maintain a threshold isolation value in view of different states or environments that a user device may operate in. In one example, the threshold isolation value can be a predetermined isolation value that the user device may operate at. In another example, the threshold isolation value can be an adjustable isolation value. In another example, the threshold isolation value can be adjusted based on user defined parameters, such as a quality of service level or a signal strength level. In another example, when the isolation value between the first and second antennas 210 and 220 falls below the threshold isolation value, the controller 280 can vary the variable components to increase the isolation value above the threshold isolation value. The controller can vary the variable components based on look-up table adjustment values and/or an algorithm as discussed in the proceeding paragraphs.

The different states that the user device may operate in (e.g., current states and new states) can include: an environment that the user device may be operating in; the user device operating adjacent to a metallic object; a movement of the user device from a location; the user device operating in a vertically upright position; and the user device operating when located adjacent to a user. The environments that the user device can operate in can include: a dielectric environment, such as an environment with porcelain, mica, glass, plastics near the user device; the dielectric environment where the user device may be moving; an environment where the user device is operating near a metal object and the user device may be moving; and so forth. The controller 280 can determine the different states of the user device using one or more sensors (e.g., the sensor takes measurements), including: an optical sensor, such as a camera; an accelerometer; a clock or timer; a temperature sensor, such as a thermostat; a pressure sensor; a touch sensor, such as a capacitive or resistive touch screen; a location sensor, such as a global positioning system (GPS) sensor or a triangulation sensor; a frequency sensor; a gyroscope; a grip sensor; an audio sensor, such as a microphone; and so forth. For example, the user device can determine that the user device is in the vertically upright position using the accelerometer and/or the gyroscope. In another example, the user device can determine when a metal object is on top of the user device using the capacitive touch screen.

Figure 3:
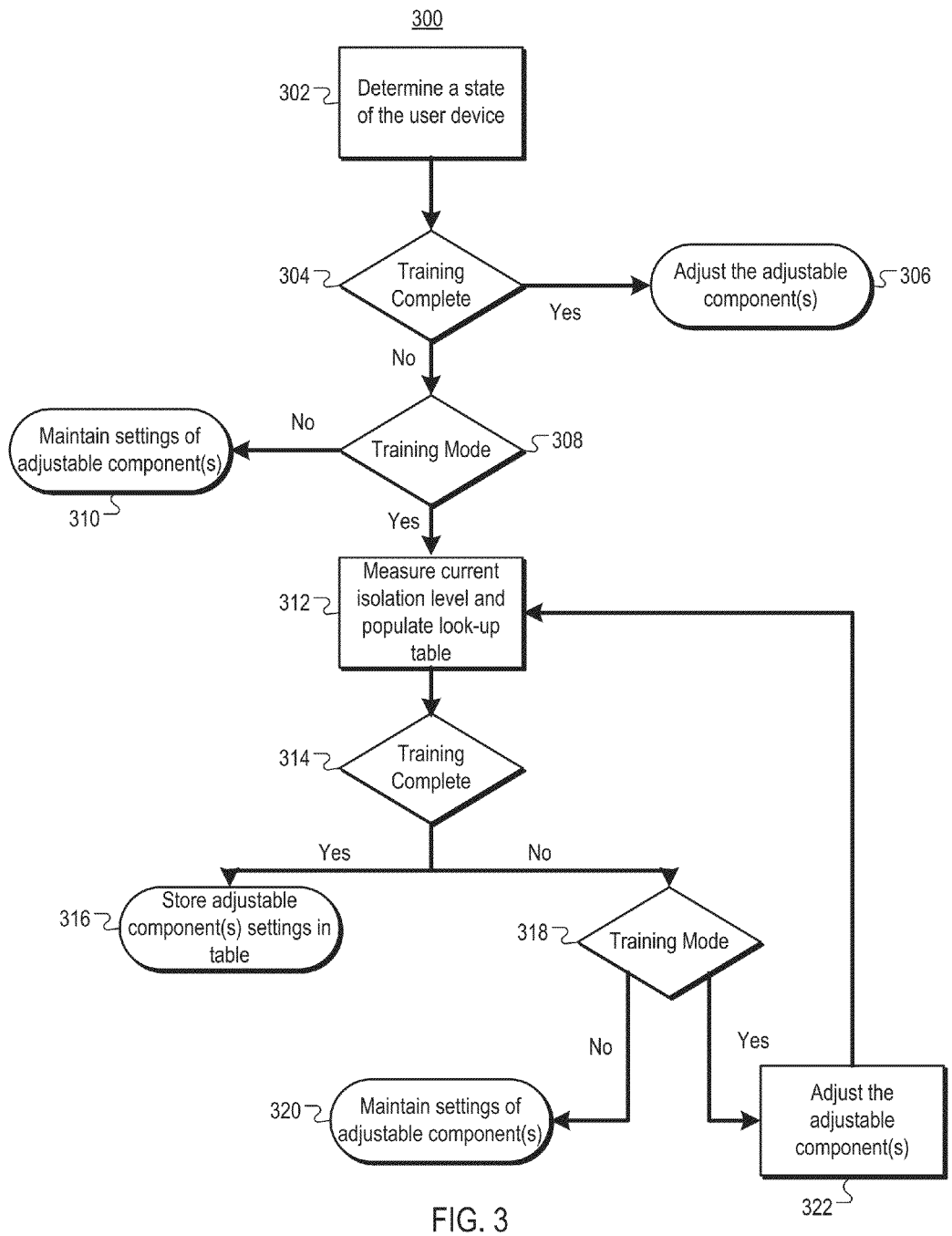
FIG. 3 is a flow diagram of an embodiment of a method of adjusting a resistance and reactance of an adaptive neutralization line according to one embodiment.

FIG. 3 is a flow diagram of an embodiment of a method 300 adjusting a resistance and reactance of an adaptive neutralization line according to one embodiment. In method 300, a user device can include a first antenna and a second antenna connected together by the adaptive neutralization line. The method can begin with the controller determining a state or environment that the user device may be operating in (block 302). In one example, the user device can initiate the determining of the state based on a state triggering event. In one example, the state triggering event can be when a sensor of the user device detects that the user device is in a predetermined state as discussed in the preceding paragraphs. In another example, the state triggering event can be a change in states of the user device. For example, the controller can determine a current state of the user device and a state triggering event can be initiated when the controller identifies a change in the state of the user device. In another example, the state triggering event can be when a predetermined period of time has passed (e.g., on a periodic basic) periodically. For example, the controller can operate in the background to adjust the variable components of an adaptive neutralization line at fixed intervals while the user device may be performing typical or normal operations.

The controller can determine when training for the determined state has completed (block 304). The training for the determined state may be completed when a predetermined number of samples of the variable component(s) for each state have been taken by the controller. When the training has completed, the controller can adjust one or more variable component(s) of the adaptive neutralization line based on adjustment values of an adjustment table for the current state or environment (block 306). When the training has not completed, the controller can determine when the user device may be operating in a training mode (block 308). The training mode can be a mode where the user device iteratively takes isolation measurements and stores settings for a threshold number of isolation measurements. The user device may enter the training mode based on a training triggering event, where the training triggering event may include: a factory reset of the user device; an initial powering on of the user device (e.g., a new device powering on); a threshold period of time having passed; when a number of isolation value measurements taken by the controller may be below a threshold amount of measurements; or when the user device may be in an environment with one or more relatively strong signals.

When the user device may not be operating in a training mode, the controller can maintain current settings of the variable component(s) (block 310). When the user device may be operating in a training mode, the controller can measure an isolation value of the antennas of the user device for the current state and store current setting values of the variable component(s) in a settings table (block 312). When the controller measures the current isolation value, the controller can determine when the training mode has completed (block 314). When the training for the determined state has completed, the controller can store the current setting values of the variable component(s) in the settings table (block 316). When the training for the determined state may not have completed, the controller can determine when the user device may be in a training mode (block 318). When the user device may not be operating in the training mode, the controller can maintain the current settings of the variable component(s) (block 320). When the user device may be operating in the training mode, the controller can adjust the one or more variable component(s) of the adaptive neutralization line (block 322). In one example the controller can randomly adjust the one or more variable component(s). In another example the controller can adjust the one or more variable component(s) using a variation amount (such as a predetermine variation amount) for one or more of the variable component(s). In another example, the controller can avoid using one or more predetermined settings when adjusting the one or more variable component(s).

In another embodiment, the controller can determine when the look-up table does not contain an entry for the current state, e.g., determine that training for the current state has not been completed previously. When the look-up table does not contain the entry, the controller can iteratively measure a current isolation value between the first antenna and the second antenna while varying the first set of settings. The controller determines the second set of settings from the current isolation values iteratively measured and stores the current isolation value and the second set of isolation for the current state into the look-up table. In a further embodiment, the controller varies the first set of settings by varying at least one of a length of the variable transmission line or a component value of the variable component.

In another embodiment, the controller determines that the look-up table contains an entry for the current state, e.g., that the electronic device is not in the training mode and maintains the first set of settings for the current state. In one implementation, the electronic device begins to iteratively measure the current isolation when a factory reset of the electronic device occurs, an initial powering of the electronic device occurs, a threshold period of time passes, the current isolation value is below a threshold amount, the electronic device is located in an environment where signal strengths of broadcast signals exceed a threshold level, or the like.

Figure 4:
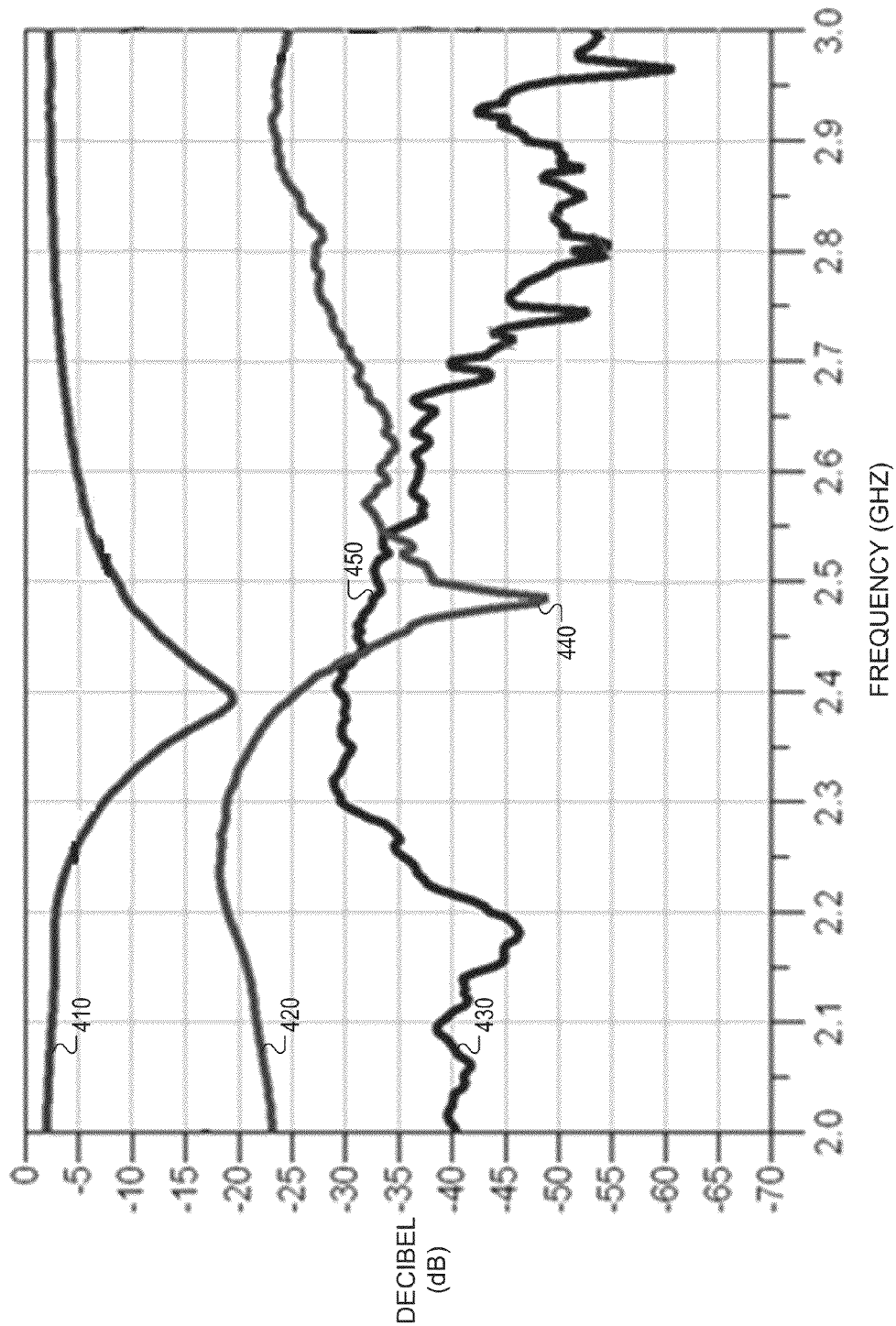
FIG. 4 illustrates a graph of return loss and measured isolation for a user device configured to communicate on a communication band according to one embodiment.

FIG. 4 illustrates a graph of return loss and measured isolation for a user device configured to communicate on a communication band according to one embodiment. The user device can include antennas with various adaptive neutralization line configurations. Line 410 shows a return loss for a user device with antennas configured with the adaptive neutralization line, as discussed in the preceding paragraphs. Line 420 shows a measured isolation value of the antennas of the user device when the user device may be configured with the adaptive neutralization line, as discussed in the preceding paragraphs. Line 430 shows a measured isolation value of the antennas of the user device when the user device may not be configured with the adaptive neutralization line. In one example, the user device may communicate information to another device using a communication band of 2.4 GHz to 2.5 GHz. At the communication band of 2.4 GHz to 2.5 GHz, the user device with the antennas configured with the adaptive neutralization line shows an isolation value of approximately −48 dB (point 440) and the user device with the antennas configured without the adaptive neutralization line shows an isolation value of approximately −33 dB (point 450). As the isolation value of the user device decreases, the interference and distortion between the antennas decreases.

Figure 5A:
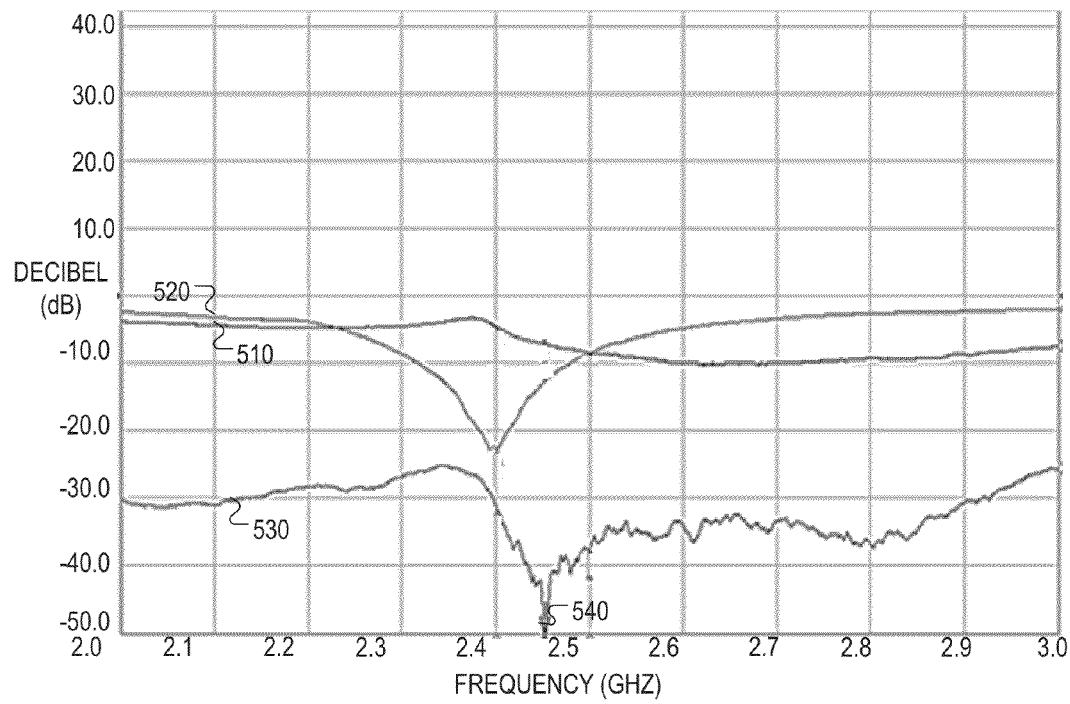
FIG. 5A illustrates a graph of a user device operating in an environment free of interfering objects according to one embodiment.
Figure 5B:
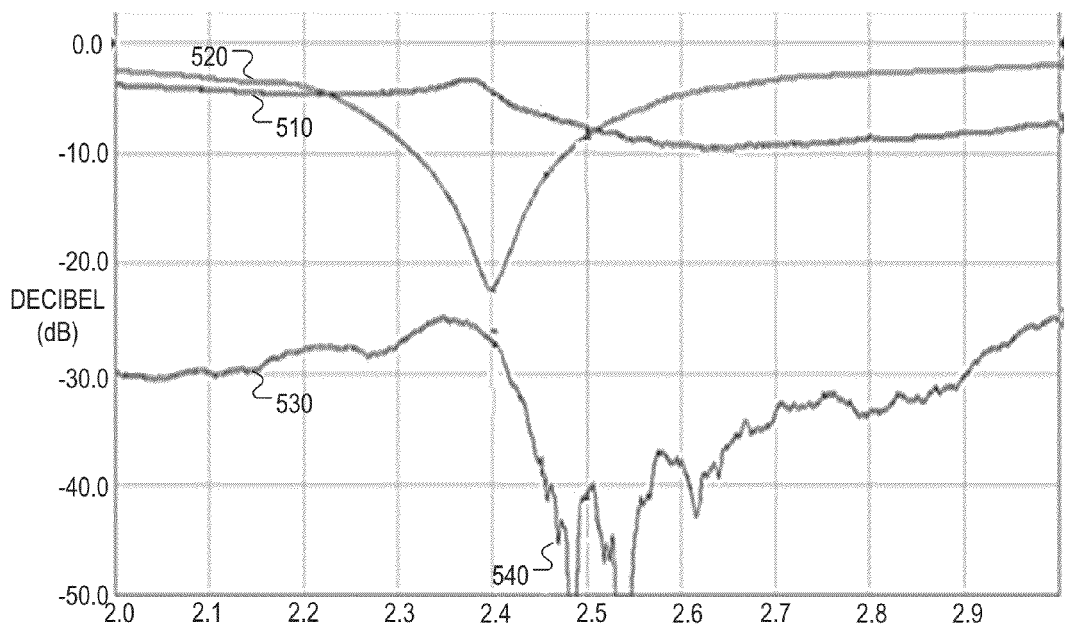
FIG. 5B illustrates a graph of a user device operating in an environment with an interfering object according to one embodiment.

FIGS. 5A and 5B illustrates graphs of return loss and measured isolation for a user device with a first antenna and a second antenna configured to communicate on a communication band between 2.4 GHz and 2.5 GHz in different environments. An adaptive neutralization line can couple the first antenna to the second antenna. FIG. 5A illustrates the user device with a first antenna and a second antenna operating in an environment free of interfering objects (such as metal objects) according to one embodiment. Line 510 shows the return loss of the first antenna with the adaptive neutralization line, as discussed in the preceding paragraphs. Line 520 shows a return loss of the second antenna configured with the adaptive neutralization line, as discussed in the preceding paragraphs. Line 530 shows a measured isolation value for the first antenna and the second antenna of the user device when the user device may be configured with the adaptive neutralization line, as discussed in the preceding paragraphs. At the communication band of 2.4 GHz to 2.5 GHz, the user device with the antennas configured with the adaptive neutralization line shows an isolation value of approximately −50 db (point 540).

FIG. 5B illustrates the user device operating in an environment with an interfering object (such as metal object) according to one embodiment. Line 510 shows a return loss of the first antenna configured with the adaptive neutralization line, as discussed in the preceding paragraphs. Line 520 shows a return loss of the second antenna with the adaptive neutralization line, as discussed in the preceding paragraphs. Line 530 shows a measured isolation value between the first antenna and the second antenna when the user device may be configured with the adaptive neutralization line, as discussed in the preceding paragraphs. However, the center frequency at which the isolation value reaches approximately −50 dB (point 540) for a user device with an adaptive neutralization line shifts from a center frequency of approximately 2.45 GHz as in FIG. 5A to a center frequency of approximately 2.49 GHz in FIG. 5B.

In response to the center frequency shifting for the various environments, the controller can adjust the variable components of the adaptive neutralization line to shift the center frequency back to a desired frequency (e.g., 2.45 GHz). In one example, the controller can shift the center frequency for the desired isolation value back to the desired frequency by adjusting a length of the adaptive neutralization line using a variable resistor, a variable inductor, and/or a variable capacitor of the adaptive neutralization line. For example, the controller can increase or decrease a resistance of the variable resistor, increase or decrease an inductance of the variable inductor, and/or increase or decrease a capacitance of the variable capacitor. In another example, the controller can change a depth of the isolation value by maintaining the length of the adaptive neutralization line while changing values of the variable resistor, the variable inductor, and/or the variable capacitor. For example, the controller can increase or decrease a resistance of the variable resistor, increase or decrease an inductance of the variable inductor, and/or increase or decrease a capacitance of the variable capacitor.

Figure 6:
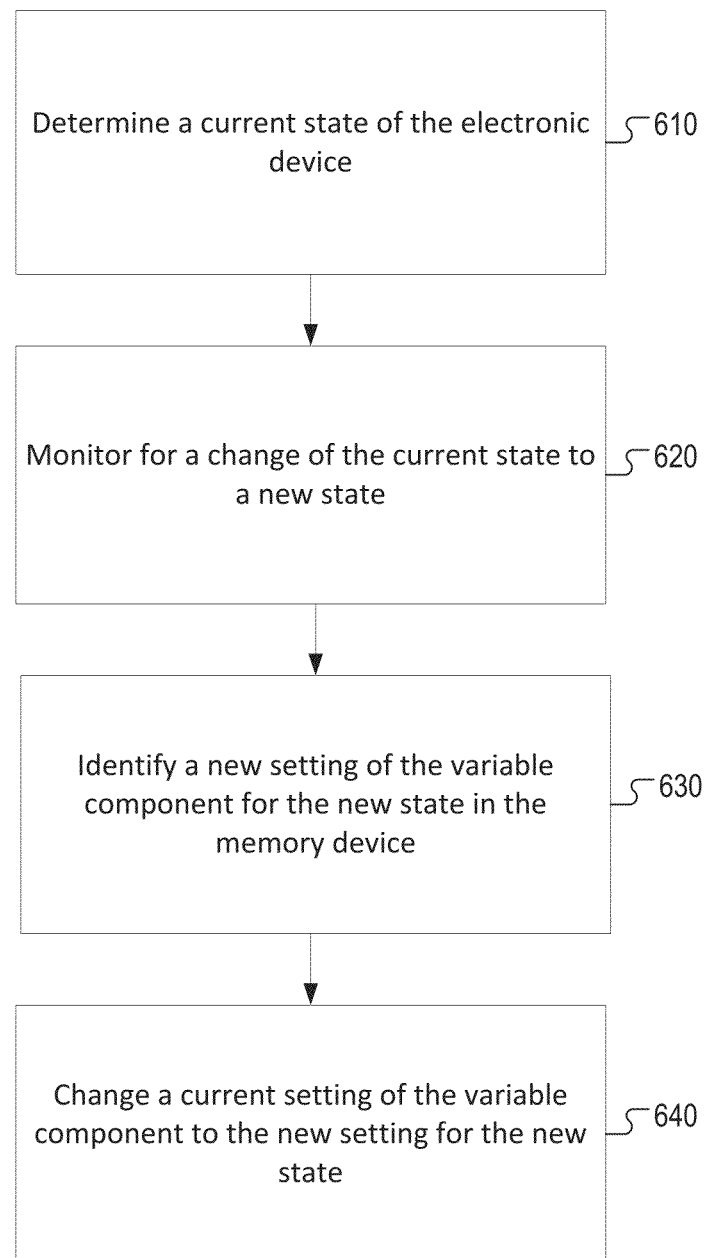
FIG. 6 is a flow diagram of an electronic device configured to change variable settings of an adaptive neutralization line according to one embodiment.

FIG. 6 is a flow diagram 600 of an electronic device configured to change settings of an adaptive neutralization line according to one embodiment. The electronic device can include: a first antenna, a second antenna, an adaptive neutralization line coupled between the first antenna and the second antenna, a sensor, and a controller. The adaptive neutralization line can include a variable component and a transmission line. The sensor can be configured to take a measurement of the electronic device. The controller can be coupled to the adaptive neutralization line. The controller can be configured to determine a current state of the electronic device using the measurement (block 610). The controller can further be configured to determine that the state of the electronic device has changed to a new state using the sensor (block 620). The controller can further be configured to identify new settings of the variable component and the transmission line for the new state in a look-up table of a memory device coupled to the electronic device (block 630). The controller can further be configured to change current settings of the variable component and the transmission line to new settings based on the identified settings for the new state (block 640).

In another embodiment, the controller can be configured to detect an environmental condition that causes an increase in a coupling (such as an original coupling) between the first antenna and the second antenna. The original coupling, also referred to as a natural coupling, is the coupling that occurs when the first antenna and the second antenna are operating within a threshold distance from each other to cause mutual coupling. Original coupling occurs when there is no neutralization line present between the two antennas or when the adaptive neutralization line, as described herein, is not being used. Some environmental conditions may cause the original coupling to increase, but the embodiments of the adaptive neutralization line as described herein may be used to adjust according to the environmental conditions to reduce or remove the original coupling. The controller adjusts a resistance and reactance of the adaptive neutralization line, adjusts the variable component of the adaptive neutralization line, or both to reduce an increased coupling caused by the environmental condition. This improves antenna-to-antenna isolation between the first antenna and second antenna. In some embodiments, the adaptive neutralization line includes a transmission line and multiple discrete components selectively coupled to the transmission line. The controller can send control signals to the adaptive neutralization line to adjust the resistance and reactance of the adaptive neutralization line by selecting different combinations of the multiple discrete components to the transmission line. For example, the components may be discrete or variable inductors, discrete or variable capacitors, or any combination thereof. These inductors and capacitors can be switched into the transmission line to alter a line length of the transmission line. In some cases the controller can alter the line length by which combination is switched in and/or altering values of the variable inductor(s), variable capacitor(s), or both. In other embodiments, the adaptive neutralization line includes a transmission line and multiple variable components coupled to the transmission line. The controller can send control signals to the adaptive neutralization line to adjust the resistance and reactance of the adaptive neutralization line by selecting a different combination of component values for the multiple variable components. For example, the variable components may be variable resistors, variable inductors, variable capacitors, or any combination thereof. The controller may adjust the resistance and reactance by changing the components values for the same length of transmission line.

In another embodiment, the controller periodically measures the antenna-to-antenna isolation and adjusts a resistance and reactance of the adaptive neutralization line, adjusts the variable component of the adaptive neutralization line, or both when the antenna-to-antenna isolation falls below a threshold value.

In another embodiment, the controller periodically determines a current state of the device from among multiple states stored in memory. The multiple states represent different environmental conditions. Each respective state includes a set of stored isolation parameters. The controller determines that the current state of the device has changed from a different state, identifies the respective set of stored isolation parameters for the current state and sends control signals to the adaptive neutralization line to apply the respective set of stored isolation parameters to the adaptive neutralization line for the current state.

In a further embodiment, a sensor is used to take a measurement of the radio device. The sensor may be any one of an optical sensor; an accelerometer; a clock; a timer; a temperature sensor; a pressure sensor; a touch sensor; a location sensor; a frequency sensor; a gyroscope; a grip sensor; an audio sensor, or the like.

In some embodiments, the environmental conditions may be various types of conditions. For example, the environmental condition may be an environment that the radio device operates in; a condition in which the radio device operates adjacent to a metallic object; a condition where the radio device moves from a location; a condition in which the radio device operates in a vertically upright position; a condition in which the radio device operates in proximity adjacent to a user, or the like.

Figure 7:
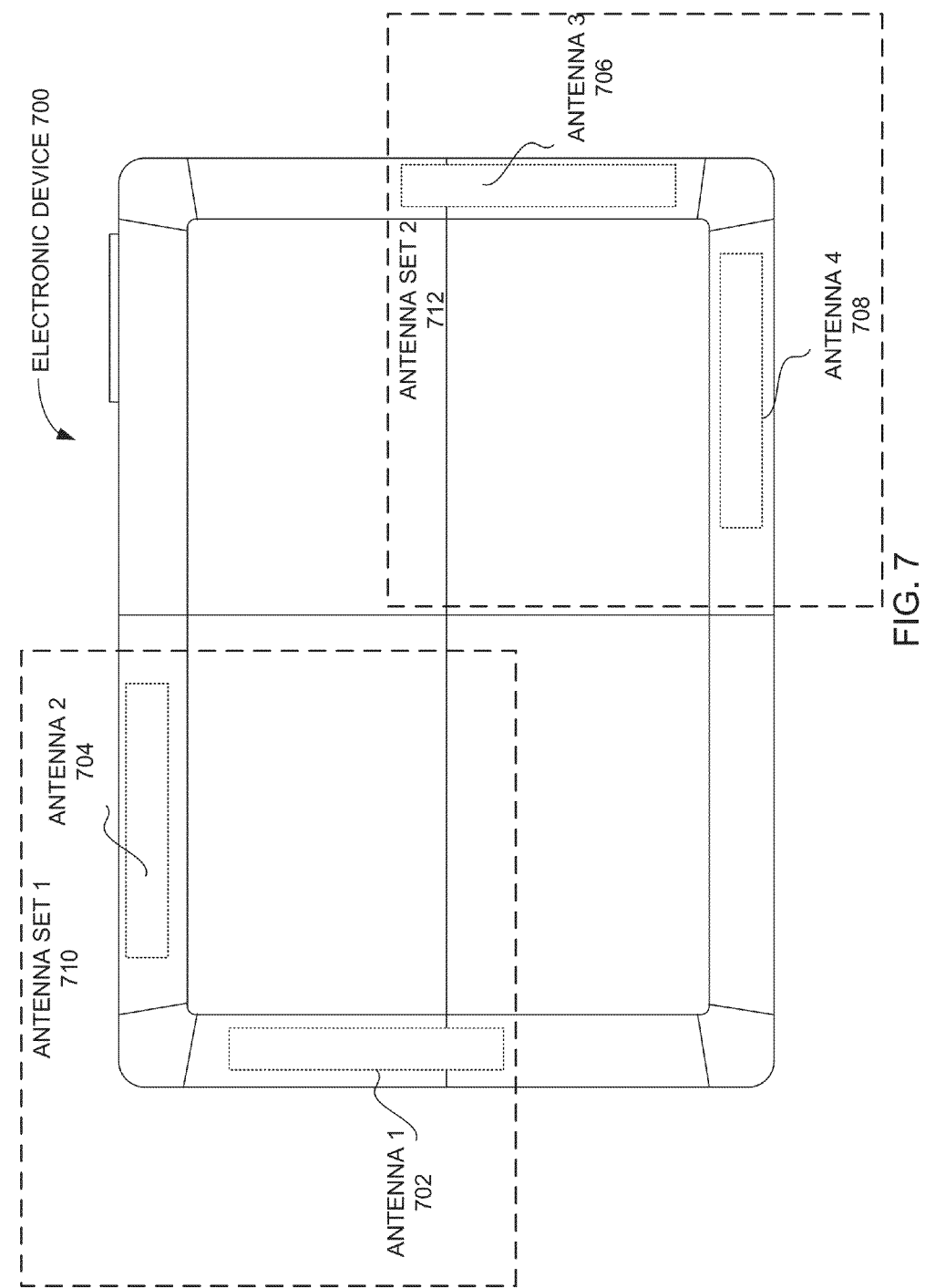
FIG. 7 illustrates an electronic device having a first antenna set and a second antenna set according to one embodiment.

FIG. 7 illustrates one example of an electronic device 700 having a first antenna set 710 and a second antenna set 712 according to one embodiment. The first antenna set 710 can include two antennas 702 and 704. The second antenna set 712 can include two antennas 706 and 708. The electronic device 700 can include a neutralization line, such as described above with respect to FIGS. 1B-2B, to distinguish between free space, and different types of objects in proximity to the electronic device 700. In one example, the first antenna set 710 can be disposed at a first location of the electronic device 700 and the second antenna set 712 can be disposed at a first location of the electronic device 700. In another example, the first antenna set 710 can have a first orientation and the second antenna set can have a second orientation that is different that the first. In another example, the first antenna set 710 and the second antenna set can have a same orientation.

The antennas 702-708 are represented as blocks but can be any type or shape of antennas as would be appreciated by one of ordinary skill in the art. In one embodiment, the antennas 702-708 may be the same type of antennas. For example, the antennas 702-708 may be antennas used for communications in a cellular band. In another embodiment, the antennas 702-708 may be different types of antennas. For example, the antennas 702 and 706 may be antennas used for communications in a cellular communications band and antennas 704 and 708 may be antennas used for communications in a wireless communications band. In another example, the antennas 702-708 may be dipole antennas, monopole antennas, folded antennas, loop antennas, and so forth.

Figure 8:
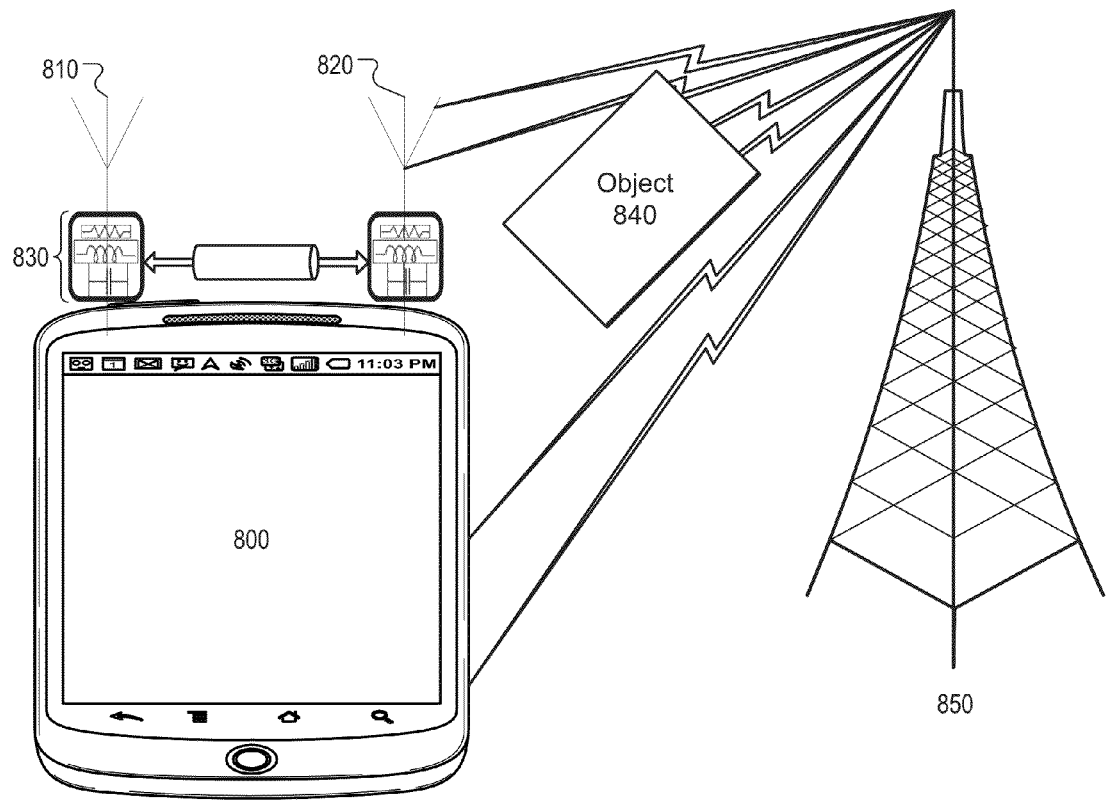
FIG. 8 illustrates an object interfering with signals transmitted between an electronic device and another device according to one embodiment.

FIG. 8 illustrates an object 840 interfering with signals transmitted between an electronic device 800 and another device 850 according to one embodiment. In one example, the electronic device 800 can monitor the isolation value between a first antenna 810 and a second antenna 820. In one example, the electronic device 800 can use a current isolation value between the first antenna 810 and the second antenna 820 to determine a proximity of the object 840, e.g., the electronic device 800 can use the neutralization line 830 as a proximity sensor to detect a when the object 840 is within a threshold distance of the electronic device 800. For example, when the object 840 may not be located between the first and second antennas 810 and 820 and the other device 850, the first and second antennas 810 and 820 may have a first isolation value. The first isolation value can be based on a tuning of the neutralization line 830. For example, when the neutralization line 830 is in a free space (e.g., no objects are within the threshold distance), the neutralization line can have a tuning value. In this example, when the object 840 may be located between the first and second antennas 810 and 820 and the other device 850, the first and second antennas 810 and 820 may have a second isolation value. The second isolation value can be based on change in the tuning value of the neutralization line 830 (e.g., a detuned value). The electronic device 800 can monitor a current isolation value of the electronic device 800 to determine when the object 840 is approximate or adjacent the device 800. In another example, the electronic device 800 can use a change in the isolation value between the first antenna 810 and the second antenna 820 to determine a proximity of the object 840. In this example, the electronic device 800 can set a value for baseline isolation value for the first and second antennas 810 and 820 when the object 840 may not be adjacent the electronic device 800. When a current isolation value between the first and second antennas 810 and 820 decreases below the baseline isolation value, the electronic device can determine that the object 840 may be adjacent the electronic device 800.

Figure 9:
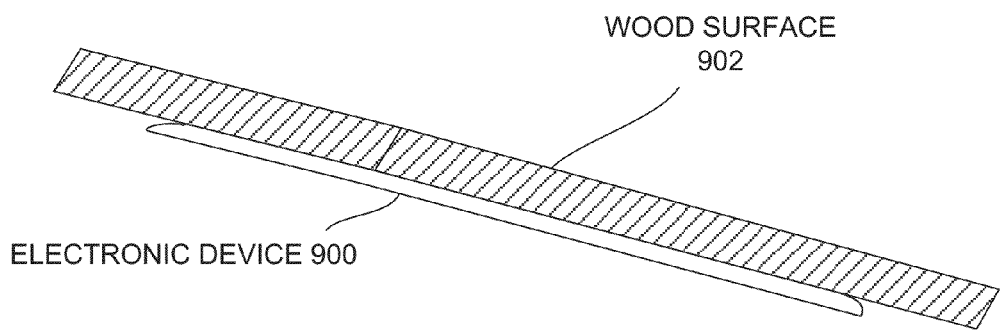
FIG. 9 illustrates the electronic device in proximity to a wood surface according to one embodiment.
Figure 10:
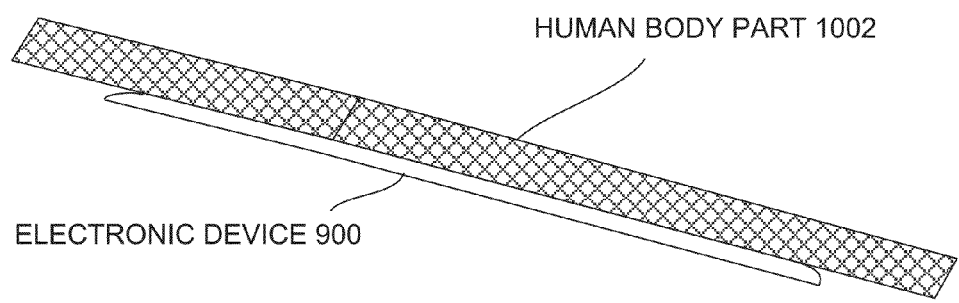
FIG. 10 illustrates the electronic device in proximity to a human body part according to one embodiment.
Figure 11:
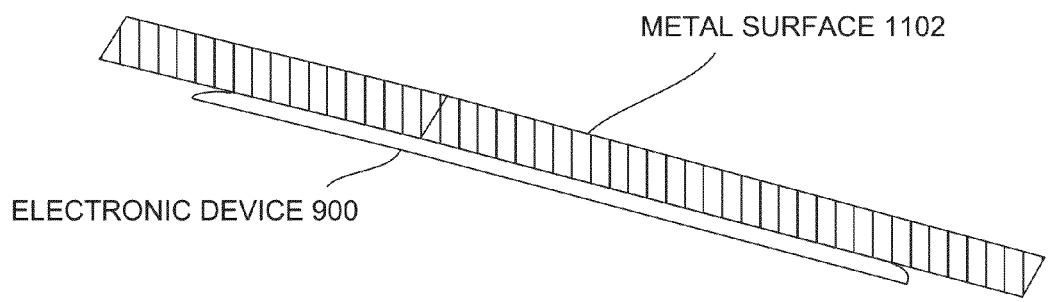
FIG. 11 illustrates the electronic device in proximity to a metal surface according to one embodiment.
Figure 12:
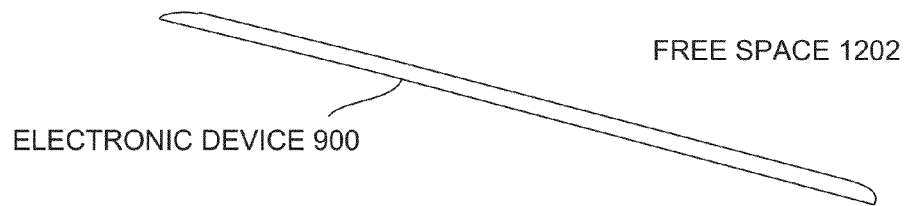
FIG. 12 illustrates the electronic device in free space according to one embodiment.

FIGS. 9-12 illustrate the electronic device 900 of FIGS. 9-12 in proximity to different types of objects and free space. In particular, FIG. 9 illustrates an example of the electronic device 900 in proximity to a wood surface 902 according to one embodiment. FIG. 10 illustrates an example of the electronic device 900 in proximity to a human body part 1002 according to one embodiment. It should be noted that human body part 1002 is represented as a rectangular box for ease of illustration. Further, the size of the human body part may vary in size, such as a hand holding the electronic device 900 or the electronic device 900 resting on a user's leg. FIG. 11 illustrates an example of the electronic device 900 in proximity to a metal surface 1102 according to one embodiment. In the preceding examples, the electronic device 900 can detect the presence of the object 902, 1002, and/or 1102 in proximity to the electronic device 900 using a neutralization line between a set of antennas of the electronic device 900. The electronic device 900 also distinguishes between the wood surface 902, human body part 1002, and the metal surface 1102 using the neutralization line. FIG. 12 illustrates an example of the electronic device 900 in free space 1202 according to one embodiment. The electronic device 900 can also distinguish between free space 1202 and an object (e.g., the wood surface 902, the human body part 1002, or the metal surface 1102) using the neutralization line as described herein.

Figure 13:
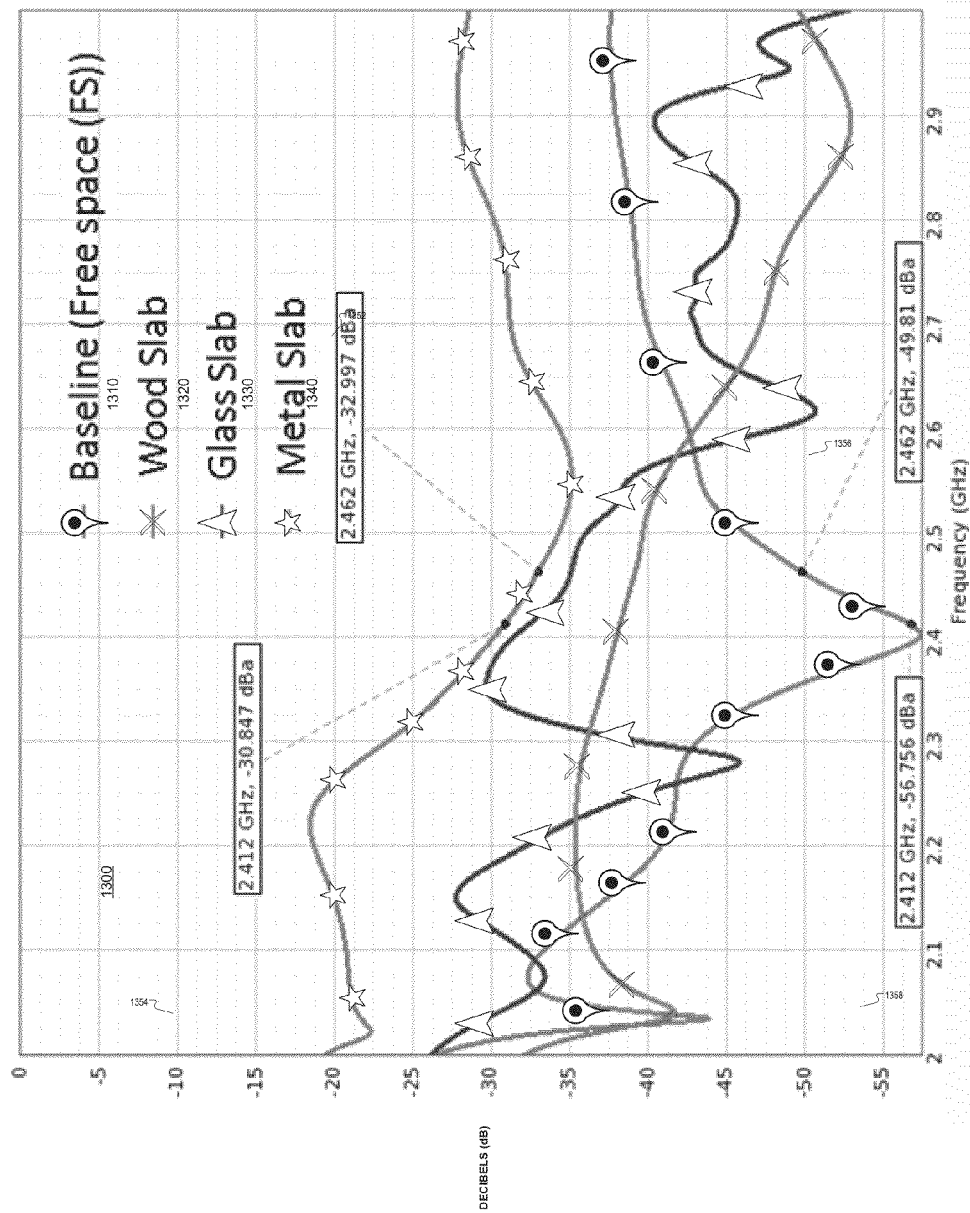
FIG. 13 illustrates a graph of an isolation value between antennas connected by a neutralization line when an electronic device comes within a threshold distance of various materials according to one embodiment.

FIG. 13 illustrates a graph 1300 of an isolation value between antennas connected by a neutralization line when an electronic device comes within a threshold distance of various materials according to one embodiment. Line 1310 shows the isolation value in decibels (dB) between antennas at various frequencies when the electronic device may be in a baseline environment, e.g., a free space environment without any interfering objects. Line 1320 shows the isolation value when the electronic device may be in an environment with a wood object adjacent the electronic device, e.g., an environment where the electronic device may be on top of a wood slab. Line 1330 shows the isolation value when the electronic device may be in an environment with a glass object adjacent the electronic device, e.g., an environment where the electronic device may be on top of a glass slab. Line 1340 shows the isolation value when the electronic device may be in an environment with a metal object adjacent the electronic device, e.g., an environment where the electronic device may be on top of a metal slab. Point 1352 shows an isolation value of −30.847 weighted dB (dBa) for the electronic device operating at 2.412 GHz when the electronic device may be operating adjacent a metal object while point 1354 shows an isolation value of −56.756 dBa for the electronic device operating at 2.412 GHz when the electronic device may be operating in a free space environment. Point 1356 shows an isolation value of −32.997 dBa for the electronic device operating at 2.462 GHz when the electronic device may be operating adjacent the metal object while point 1358 shows an isolation value of −49.81 dBa for the electronic device operating at 2.462 GHz when the electronic device may be operating adjacent in the free space environment.

The graph 1300 further illustrates that the isolation value between a set of antennas adjacent the wood object, the glass object, and/or the metal object may be higher than the isolation value for the set of antennas when operating in free space for a selected frequency range, such as a 2.4 GHz. In one example, thresholds values can be set to distinguish between the objects using the neutralization line. For example, at 2.4 GHz, when the isolation value may be below −29 dB and above −30.5 dB, the detected object may be the metal object. Furthermore, at 2.4 GHz, when the isolation value may be below −30.5 dB and above −35 dB, the detected object may be the glass object, instead of the metal object. Additionally, at 2.4 GHz, when the mutual coupling may be below −35 dB and above −45 dB, the detected object may be the wood object, instead of the glass object. At 2.4 GHz, when the mutual coupling may be below −45 dB, the electronic device may be operating in free space, instead of adjacent the wood object. In one example, the isolation values for the different types of objects can be predetermined. For example, a device can include predetermined control settings that include predetermined isolation values for the different types of objects.

In one example, the threshold values can be set for a range of frequencies, a frequency level, or for a specific frequency. For example, a range of values can be specified to indicate when the isolation value indicates that the object may be a metal object. Similar ranges can be defined for the free space, the wood object, the glass object, a ceramic object, fluids, or other objects or materials. In another example, the neutralization line can be tested to define a baseline value for the isolation value to set the threshold values for the different thresholds to distinguish between object types. In another example, the neutralization line can be tested to define a baseline value for the isolation value to set the threshold values for the different thresholds to distinguish between objects with a same effect on the isolation level. In another example, the baseline value and threshold values may vary based on different type of antennas or other dielectrics used for a device. The objects and environments disclosed herein are exemplary objects and environments. The disclosed objects and environments are not exhaustive and one skilled in the art would understand that other objects and environments can be used.

Figure 14:
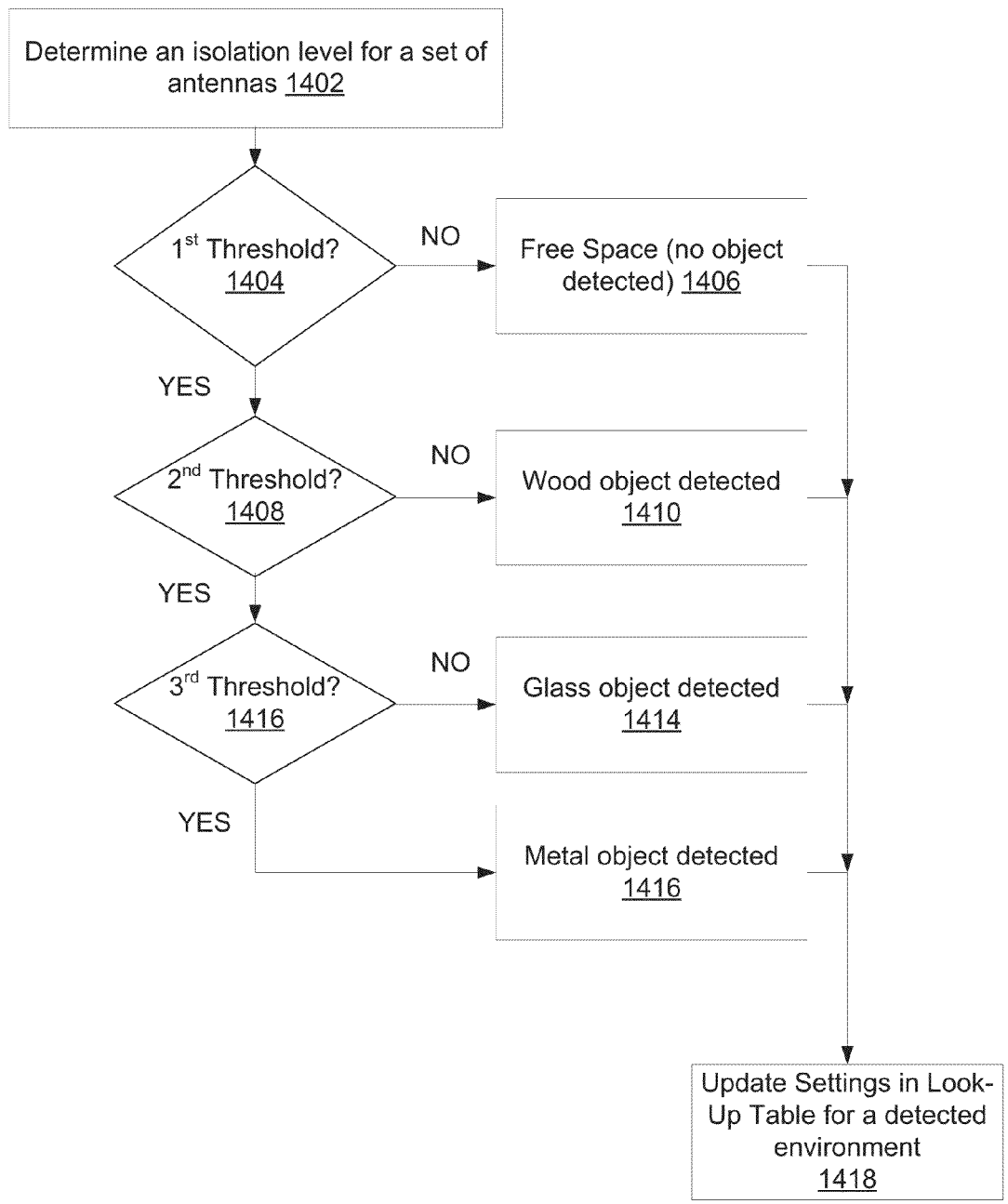
FIG. 14 is a flow diagram of a method of updating settings in a look-up table for a detected object according to one embodiment.

FIG. 14 is a flow diagram of a method 1400 of updating settings in a look-up table for a detected object according to one embodiment. The method 1400 may be performed by processing logic that may comprise hardware (circuitry, dedicated logic, etc.), software (such as is run on a general purpose computing system or a dedicated machine), firmware (embedded software), or any combination thereof.

Referring to FIG. 14, the method 1400 begins by determining an isolation value for a set of antennas (block 1402). The electronic device can compare the isolation value to a first threshold value (block 1404). If the isolation value does not exceed the first threshold value, the electronic device can determine that the set of antennas may be operating in a free space (no object detected) (block 1406). If the isolation value exceeds the first threshold value, the electronic device can compare the isolation value to a second threshold value (block 1408). If the isolation value does not exceed the second threshold value, the electronic device can determine that the set of antennas may be operating adjacent a wood object (block 1410). If the isolation value exceeds the second threshold value, the electronic device can compare the isolation value to a third threshold value (block 1412). If the isolation value does not exceed the third threshold value, the electronic device can determine that the set of antennas may be operating adjacent a glass object (block 1414). If the isolation value exceeds the third threshold value, the electronic device can determine that the set of antennas may be operating adjacent a metal object (block 1416). If the electronic device determines an environment or condition that the set of antennas may be operating in (e.g., free space or adjacent an object), the electronic device can update settings of variable components in the look-up table (as discussed in FIG. 3) for the detected environment or condition (block 1418). For example, graph 1400 in FIG. 14 shows isolation values when the electronic device may be in different detected environments or conditions, such as approximate a wood slab, a glass slab, a metal slab, a ceramic slab, a fluid, or in a free space environment. In another example, the baseline value and threshold values may vary based on different type of antennas or other dielectrics used for a device. The objects and environments disclosed herein are exemplary objects and environments. The disclosed objects and environments are not exhaustive and one skilled in the art would understand that other objects and environments can be used.

Figure 15:
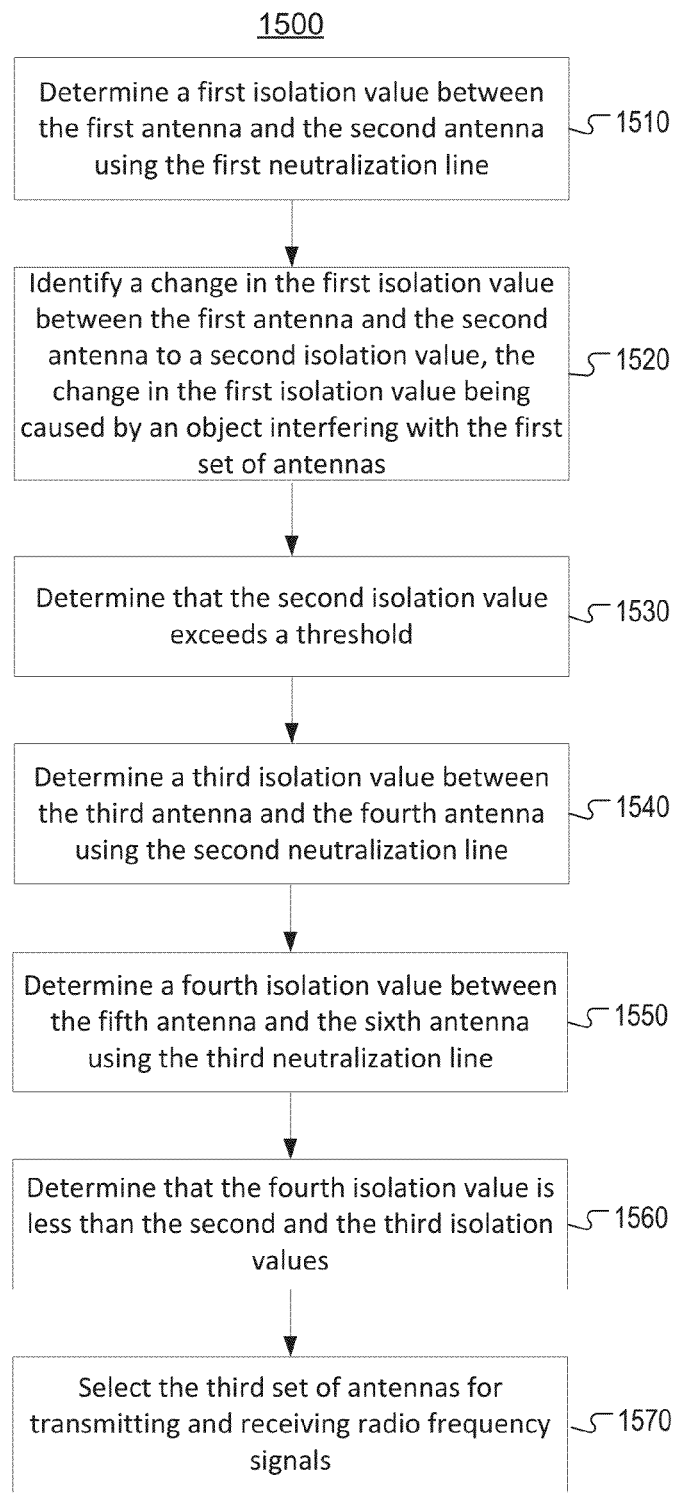
FIG. 15 is a flow diagram of an electronic device configured to switch a set of antennas used for communication when an isolation value of the set of antennas changes according to one embodiment.

FIG. 15 is a flow diagram 1500 of an electronic device configured to switch a set of antennas used for communication if an isolation value of the set of antennas changes according to one embodiment. The electronic device can include: a first set of antennas with a first antenna and a second antenna, and a first neutralization line coupled between the first antenna and the second antenna; a second set of antennas with a third antenna and a fourth antenna, and a second neutralization line coupled between the third antenna and the fourth antenna; a third set of antennas with a fifth antenna and a sixth antenna, and a third neutralization line coupled between the fifth antenna and the sixth antenna; and a controller coupled to the first neutralization line, the second neutralization line, and the third neutralization line. The controller can be configured to determine a first isolation value between the first antenna and the second antenna using the first neutralization line (block 1510). The controller can further be configured to identify a change in the first isolation value between the first antenna and the second antenna to a second isolation value, the change in the first isolation value being caused by an object interfering with the first set of antennas (block 1520). The controller can further be configured to determine that the second isolation value exceeds a threshold (block 1530). The controller can further be configured to determine a third isolation value between the third antenna and the fourth antenna using the second neutralization line (block 1540). The controller can further be configured to determine a fourth isolation value between the fifth antenna and the sixth antenna using the third neutralization line (block 1550). The controller can further be configured to determine that the fourth isolation value is less than the second and the third isolation values (block 1560). The controller can further be configured to select the third set of antennas for transmitting and receiving radio frequency signals (block 1570).

The first set of antennas can disposed at a first location of a housing of the electronic device and the second set of antennas can disposed at a second location of the housing. In one embodiment, the controller configured to detect that the first isolation value exceeds the threshold and determine the object is proximate to the first set of antennas. In another embodiment, the controller can identify the change in the first isolation value between the first antenna and the second antenna by: determine a tuning value of the first neutralization line; detect a change in the tuning value; and determine a change in the first isolation value based on the changed tuning value. In one example, the threshold can be indicative of isolation between the first set of antennas when the object may not be within a threshold distance of the first set of antennas. In this example, the controller can be configured to determine that the object may be within the threshold distance based on the determination that the second isolation value exceeds the threshold.

Figure 16:
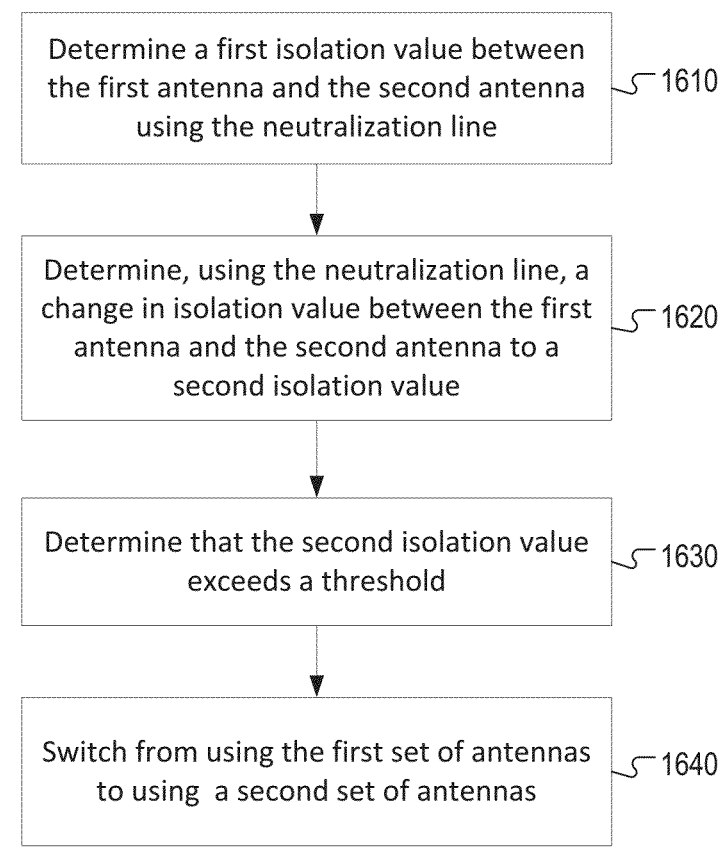
FIG. 16 is a flow diagram of an electronic device configured to switch a set of antennas used for communication when an isolation value of the set of antennas changes according to one embodiment.

FIG. 16 is a flow diagram 1600 of an electronic device configured to switch a set of antennas used for communication if an isolation value of the set of antennas changes according to one embodiment. The electronic device can include: a first set of antennas, with a first antenna and a second antenna and a neutralization line coupled between the first antenna and the second antenna; and a controller coupled to the neutralization line. The controller can determine a first isolation value between the first antenna and the second antenna using the neutralization line (block 1610). The controller can further determine a change in isolation value between the first antenna and the second antenna to a second isolation value (block 1620). The controller can further determine that the second isolation value exceeds a threshold (block 1630). The controller can further switch from using the first set of antennas to using a second set of antennas (block 1640).

In one embodiment, the first set of antennas can be disposed in a first orientation and the second set of antennas can be disposed in a second orientation, where the first orientation may be substantially perpendicular to the second orientation. In one embodiment, the first isolation value can be a baseline value based on the device operating in a free space. In another embodiment, the controller can further configured to determine that an object is within a threshold distance of the first antenna and the second antenna based on the second isolation value. In another embodiment, the device can include multiple antennas, and the controller can randomly switch to one of the multiple antennas. The first set of antennas can be disposed at a first location of a housing of the device and the second set of antennas can be disposed at a second location of the housing. In another embodiment, the controller can determine a proximity of an object to the first antenna and the second antenna using the first neutralization line by: determining a tuning value of the first neutralization line; detecting a change in the tuning value; and determining a proximity of the object based on the changed tuning value.

Figure 17:
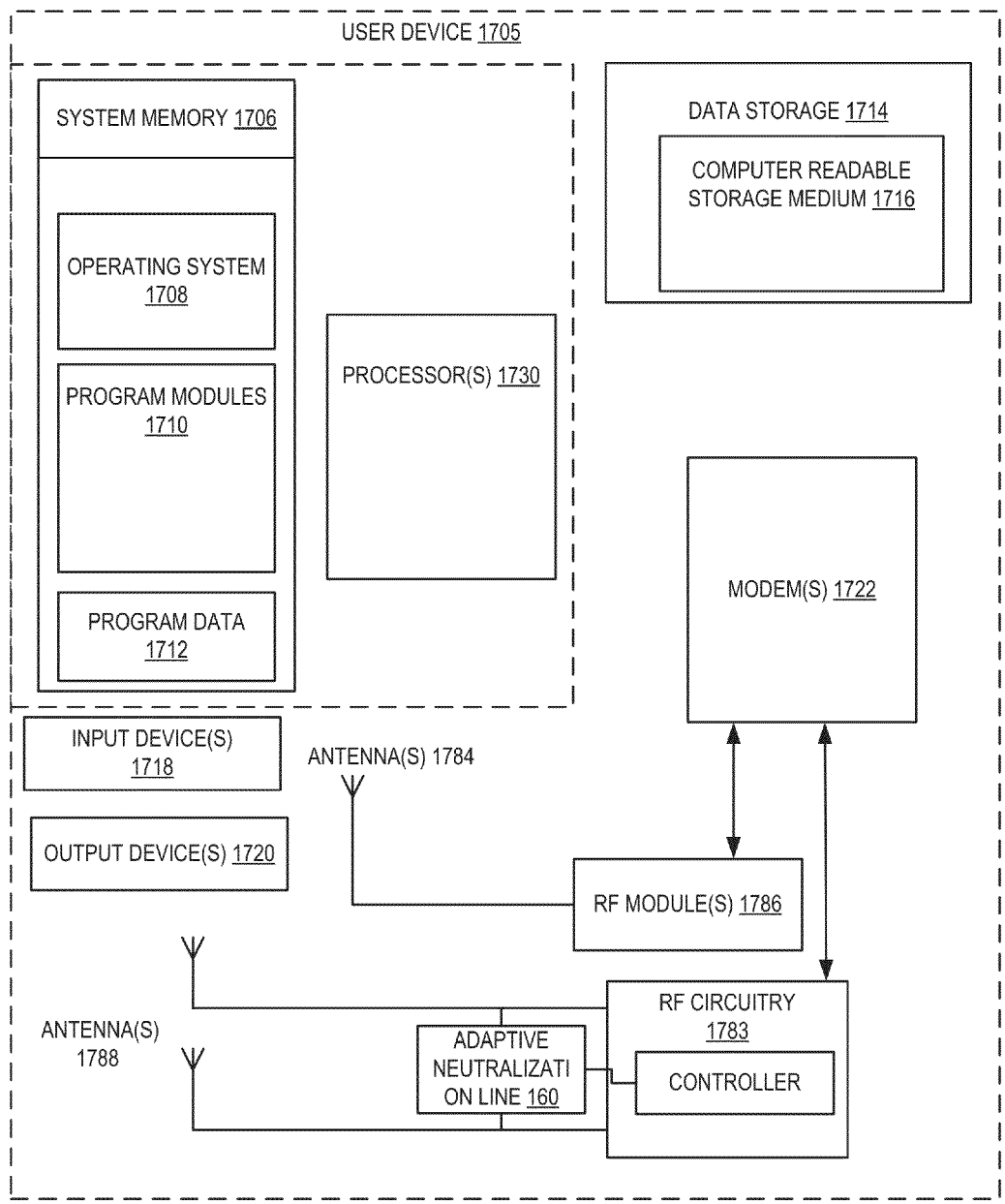
FIG. 17 is a block diagram of a user device in which embodiments of a radio device with an adaptive neutralization line may be implemented.

In one example, the first antenna and/or the second antenna can transmit and receive radio frequency signals at a first frequency and a second frequency, wherein the threshold is different for the first frequency and the second frequency. In one example, the second set of antennas can include a third antenna and a fourth antenna and a second neutralization line coupled between the third antenna and the fourth antenna; and wherein the controller can further: determine a third isolation value between the third antenna and the fourth antenna using the second neutralization line; determine that the third isolation value may be greater than the second isolation value; and switch from using the second set of antennas to using the first set of antennas In another example, the first antenna and the second antenna can be a first type of antenna and the third antenna and the fourth antenna can be a second type of antenna FIG. 17 is a block diagram of a user device 1705 in which embodiments of a radio device with an adaptive neutralization line may be implemented. The user device 1705 may correspond to the user device of FIGS. 1A-1E. The user device 1705 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1705 may be any portable or stationary user device. For example, the user device 1705 may be an intelligent voice control and speaker system. Alternatively, the user device 1705 can be any other device used in a WLAN network (e.g., Wi-Fi® network), a WAN network, or the like.

The user device 1705 includes one or more processor(s) 1730, such as one or more CPUs, microcontrollers, field programmable gate arrays, or other types of processors. The user device 1705 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of the method 300, 600, 1400, 1500, and 1600 as described herein. The user device 1705 performs functions by using the processor(s) 1730 to execute instructions provided by the system memory 1706.

The user device 1705 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 may reside, completely or at least partially, within the computer-readable storage medium 1716, system memory 1706 and/or within the processor(s) 1730 during execution thereof by the user device 1705, the system memory 1706 and the processor(s) 1730 also constituting computer-readable media. The user device 1705 may also include one or more input devices 1718 (keyboard, mouse device, specialized selection keys, etc.) and one or more output devices 1720 (displays, printers, audio output mechanisms, etc.).

The user device 1705 further includes a modem 1722 to allow the user device 1705 to communicate via a wireless network (e.g., such as provided by the wireless communication system) with other computing devices, such as remote computers, an item providing system, and so forth. The modem 1722 can be connected to RF circuitry 1783 and zero or more RF modules 1786. The RF circuit 1783 may include a controller 1785, as described herein. An adaptive neutralization line 160, as described herein is coupled between the antennas 1788 and is coupled to the controller 1783. The controller 1783 controls the adaptive neutralization line 160 to reduce the mutual coupling between the antennas 1788, which increase isolation between the antennas 1788 as described herein. The RF circuitry 1783 may be a WLAN module, a WAN module, PAN module, or the like. Antennas 1788 are coupled to the RF circuitry 1783, which is coupled to the modem 1722. Zero or more antennas 1784 can be coupled to one or more RF modules 1786, which are also connected to the modem 1722. The zero or more antennas 1784 may be GPS antennas, NFC antennas, other WAN antennas, WLAN or PAN antennas, or the like. The modem 1722 allows the user device 1705 to handle both voice and non-voice communications (such as communications for text messages, multimedia messages, media downloads, web browsing, etc.) with a wireless communication system. The modem 1722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1722 may generate signals and send these signals to antenna 1788, and 1784 via RF circuitry 1783 and RF module(s) 1786 as descried herein. User device 1705 may additionally include a WLAN module, a GPS receiver, a PAN transceiver and/or other RF modules. These RF modules may additionally or alternatively be connected to one or more of antennas 1784, 1788. Antennas 1784, 1788 may be configured to transmit in different frequency bands and/or using different wireless communication protocols. The antennas 1784, 1788 may be directional, omnidirectional, or non-directional antennas. In addition to sending data, antennas 1784, 1788 may also receive data, which is sent to appropriate RF modules connected to the antennas.

In one embodiment, the user device 1705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1722 is shown to control transmission and reception via antenna (1784, 1788), the user device 1705 may alternatively include multiple modems, each of which is configured to transmit/receive data via a different antenna and/or wireless transmission protocol.

The user device 1705 delivers and/or receives items, upgrades, and/or other information via the network. For example, the user device 1705 may download or receive items from an item providing system. The item providing system receives various requests, instructions and other data from the user device 1705 via the network. The item providing system may include one or more machines (e.g., one or more server computer systems, routers, gateways, etc.) that have processing and storage capabilities to provide the above functionality. Communication between the item providing system and the user device 1705 may be enabled via any communication infrastructure. One example of such an infrastructure includes a combination of a wide area network (WAN) and wireless infrastructure, which allows a user to use the user device 1705 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 1705.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1705 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1705 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
a first set of antennas comprising a first antenna and a second antenna, and a first neutralization line coupled between the first antenna and the second antenna;
a second set of antennas comprising a third antenna and a fourth antenna, and a second neutralization line coupled between the third antenna and the fourth antenna;
a third set of antennas comprising a fifth antenna and a sixth antenna, and a third neutralization line coupled between the fifth antenna and the sixth antenna; and
a controller coupled to the first neutralization line, the second neutralization line, and the third neutralization line, wherein the controller is configured to:
determine a first isolation value between the first antenna and the second antenna using the first neutralization line;
identify, using the first neutralization line, a change in the first isolation value between the first antenna and the second antenna to a second isolation value, the change in the first isolation value being caused by an object interfering with the first set of antennas;

determine that the second isolation value exceeds a threshold;

determine a third isolation value between the third antenna and the fourth antenna using the second neutralization line;

determine a fourth isolation value between the fifth antenna and the sixth antenna using the third neutralization line;

determine that the fourth isolation value is less than the second and the third isolation values; and select the third set of antennas for transmitting and receiving radio frequency signals in response to the fourth isolation value being less than the second and the third isolation values.

2. The electronic device of claim 1, wherein the controller is configured to:

detect that the first isolation value exceeds the threshold; and determine the object is proximate to the first set of antennas.

3. The electronic device of claim 1, wherein the controller is configured to identify the change in the first isolation value between the first antenna and the second antenna by:

determine a tuning value of the first neutralization line;

detect a change in the tuning value; and determine a change in the first isolation value based on the changed tuning value.

4. A device comprising:

a first set of antennas comprising a first antenna and a second antenna and a neutralization line coupled between the first antenna and the second antenna; and a controller coupled to the neutralization line, wherein the controller is configured to:

determine a first isolation value between the first antenna and the second antenna using the neutralization line;

determine, using the neutralization line, a change in the first isolation value between the first antenna and the second antenna to obtain a second isolation value;

determine that the second isolation value exceeds a threshold; and switch from using the first set of antennas to using a second set of antennas in response to the second isolation value exceeding the threshold.

5. The device of claim 4, wherein the first set of antennas are disposed in a first orientation and the second set of antennas are disposed in a second orientation, wherein the first orientation is substantially perpendicular to the second orientation.

6. The device of claim 4, wherein the first isolation value is a baseline value based on the device operating in a free space.

7. The device of claim 4, wherein the controller is further configured to determine that an object is within a threshold distance of the first antenna and the second antenna based on the second isolation value.

8. The device of claim 4, wherein the controller is configured to determine a proximity of an object to the first antenna and the second antenna using the neutralization line by:

determining a tuning value of the neutralization line;

detecting a change in the tuning value; and determining a proximity of the object based on the changed tuning value.

9. The device of claim 4, wherein at least one of the first antenna or the second antenna is configured to transmit and receive radio frequency signals at a first frequency and a second frequency, wherein the threshold is different for the first frequency and the second frequency.

10. The device of claim 4, wherein the second set of antennas comprises a third antenna and a fourth antenna and a second neutralization line coupled between the third antenna and the fourth antenna; and wherein the controller is further configured to:

determine a third isolation value between the third antenna and the fourth antenna using the second neutralization line;

determine that the third isolation value is greater than the second isolation value; and switch from using the second set of antennas to using the first set of antennas.

11. The device of claim 10, wherein the first antenna and the second antenna are a first type of antenna and the third antenna and the fourth antenna are a second type of antenna.

12. A device comprising:

a first antenna and a second antenna, and a first neutralization line coupled between the first antenna and the second antenna; and a controller coupled to the first neutralization line, wherein the controller is configured to:

determine a first isolation value between the first antenna and the second antenna using the first neutralization line;

determine, using the first neutralization line, a change in the first isolation value between the first antenna and the second antenna to a second isolation value, the change in the first isolation value being caused by an object interfering with the first antenna and the second antenna;

determine that the second isolation value exceeds a threshold; and switch from using the first antenna and the second antenna to using a third antenna and a fourth antenna, wherein the third antenna and the fourth antenna are couple together by a second neutralization line in response to the second isolation value exceeding the threshold.

13. The device of claim 12, wherein the controller is further configured to:

identify a change in the second isolation value;

determine that the second isolation value exceeds the threshold; and switch from using the third antenna and the fourth antenna to using the first antenna and the second antenna.

14. The device of claim 12, determine the change in the first isolation value between the first antenna and the second antenna by:

determining a tuning value of the first neutralization line;

detecting a change in the tuning value; and determining a proximity of the object based on the changed tuning value.

15. The device of claim 12, wherein the first antenna and the second antenna are a first type of antenna and the third antenna and the fourth antenna are a second type of antenna.

16. The device of claim 12, wherein the first antenna and the second antenna are disposed in a first orientation and the third antenna and the fourth antenna are disposed in a second orientation, wherein the first orientation is substantially perpendicular to the second orientation.

17. The device of claim 12, wherein the first antenna and the second antenna and the third antenna and the fourth antenna are disposed in a same orientation.

18. The device of claim 12, wherein the isolation value is a baseline value based on the device operating in a free space.

19. The device of claim 12, wherein at least one of the first antenna or the second antenna is configured to transmit and receive radio frequency signals at a first frequency and a second frequency, wherein the threshold is different for the first frequency and the second frequency.

20. The device of claim 12, wherein the controller is configured to:
- detect that the first isolation value exceeds the threshold; and
- determine the object is proximate to the first set of antennas.

* * * * *